United States Patent
Hughey

(10) Patent No.: US 6,423,142 B1
(45) Date of Patent: *Jul. 23, 2002

(54) POWER SUPPLY CONTROL SYSTEM

(75) Inventor: Daniel C. Hughey, Indianapolis, IN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/377,464

(22) Filed: Aug. 19, 1999

Related U.S. Application Data

(62) Division of application No. 08/953,858, filed on Oct. 16, 1997.

(51) Int. Cl.$^7$ .................. B05B 5/025; H02M 7/538
(52) U.S. Cl. .................. 118/621; 363/97; 363/26
(58) Field of Search .................. 118/620, 621; 363/97, 26, 17, 24, 25, 61, 95, 98

(56) References Cited

U.S. PATENT DOCUMENTS

| | | |
|---|---|---|
| 2,767,359 A | 10/1956 | Larsen et al. |
| 3,273,015 A | 9/1966 | Fischer |
| 3,627,661 A | 12/1971 | Gordon et al. |
| 3,641,971 A | 2/1972 | Walberg |
| 3,731,145 A | 5/1973 | Senay |
| 3,764,883 A | 10/1973 | Staad et al. |
| 3,795,839 A | 3/1974 | Walberg |
| 3,809,955 A | 5/1974 | Parson |

(List continued on next page.)

FOREIGN PATENT DOCUMENTS

| | | |
|---|---|---|
| DE | 24 36 142 | 2/1975 |
| DE | 32 15 644 A1 | 10/1983 |
| EP | 0 160 179 A2 | 11/1985 |
| GB | 2 077 006 A | 12/1981 |

OTHER PUBLICATIONS

Rans–Pak 1000™ Power Supply brochure, May, 1990, 2 pages.
Rans–Pak 1000™ Power Supply service manual, 1991, 25 pages.
Rans–Pak 100™ Power Supply brochure, May, 1988, 1 page.
Rans–Pak 300™ Power Supply brochure, Sep., 1990, 2 pages.
Ransburg GEMA Series 400 Power Supply Panel Service Manual, Apr., 1990, 59 pages.
Kazkaz, Electric Field and Space Charge of Spherical Electrode at High Voltage Concentric With a Spherical Grounded Conductive Target: Proc. at the 1996 Industry Applications Society 31$^{1st}$ Annual Mtg., San Diego, CA, 1904–1911 (Oct. 1996).

*Primary Examiner*—Richard Crispino
*Assistant Examiner*—Kevin P. Shortsle
(74) *Attorney, Agent, or Firm*—Barnes & Thornburg

(57) ABSTRACT

A high magnitude potential supply comprises a first circuit for generating a first signal related to a desired output high magnitude potential across a pair of output terminals of the supply, a second circuit for generating a second signal related to an output current from the high magnitude potential supply, and a third circuit for supplying an operating potential to the high magnitude potential supply so that it can produce the high magnitude operating potential. The third circuit has a control terminal. A fourth circuit is coupled to the first and second circuits and to the control terminal. The fourth circuit receives the first and second signals from the first and second circuits and controls the operating potential supplied to the high magnitude potential supply by the third circuit. A fifth circuit is provided for disabling the supply of operating potential to the high magnitude potential supply in certain conditions so that no high magnitude operating potential can be supplied by it. The fifth circuit is also coupled to the control terminal.

31 Claims, 20 Drawing Sheets

U.S. PATENT DOCUMENTS

| | | |
|---|---|---|
| 3,851,618 A | 12/1974 | Bentley |
| 3,872,370 A | 3/1975 | Regnault |
| 3,875,892 A | 4/1975 | Gregg et al. |
| 3,893,006 A | 7/1975 | Algeri et al. |
| 3,894,272 A | 7/1975 | Bentley |
| 3,895,262 A | 7/1975 | Ribnitz |
| 3,970,920 A | 7/1976 | Braun |
| 4,000,443 A | 12/1976 | Lever |
| 4,038,593 A | 7/1977 | Quinn |
| 4,073,002 A | 2/1978 | Sickles et al. |
| 4,075,677 A | 2/1978 | Bentley |
| 4,182,490 A | 1/1980 | Kennon |
| 4,187,527 A | 2/1980 | Bentley |
| 4,196,465 A | 4/1980 | Buschor |
| 4,266,262 A | 5/1981 | Haase, Jr. |
| 4,287,552 A | 9/1981 | Wagner et al. |
| 4,323,947 A | 4/1982 | Huber |
| 4,324,812 A | 4/1982 | Bentley |
| 4,343,828 A | 8/1982 | Smead et al. |
| 4,353,970 A | 10/1982 | Dryczynski et al. |
| 4,377,838 A | 3/1983 | Levey et al. |
| 4,385,340 A | 5/1983 | Kuroshima |
| 4,402,030 A | 8/1983 | Moser et al. |
| 4,409,635 A | 10/1983 | Kraus |
| 4,472,781 A | 9/1984 | Miller |
| 4,481,557 A | 11/1984 | Woodruff |
| 4,485,427 A | 11/1984 | Woodruff et al. |
| 4,508,276 A | 4/1985 | Malcolm |
| 4,538,231 A | 8/1985 | Abe et al. |
| 4,587,605 A | 5/1986 | Kouyama et al. |
| 4,630,220 A | 12/1986 | Peckinpaugh |
| 4,651,264 A | 3/1987 | Shiao-Chung Hu |
| 4,672,500 A | 6/1987 | Tholome Roger et al. |
| 4,674,003 A | 6/1987 | Zylka |
| 4,698,517 A | 10/1987 | Tohya et al. |
| 4,710,849 A | 12/1987 | Norris |
| 4,737,887 A | 4/1988 | Thome |
| 4,745,520 A | 5/1988 | Hughey |
| 4,764,393 A | 8/1988 | Henger et al. |
| 4,797,833 A | 1/1989 | El-Amawy et al. |
| 4,809,127 A | 2/1989 | Steinman et al. |
| 4,825,028 A | 4/1989 | Smith |
| 4,841,425 A | 6/1989 | Maeba et al. |
| 4,890,190 A | 12/1989 | Hemming |
| 4,891,743 A | 1/1990 | May et al. |
| 4,912,588 A | 3/1990 | Thome et al. |
| 4,916,571 A | 4/1990 | Staheli |
| 4,920,246 A | 4/1990 | Aoki |
| 5,012,058 A | 4/1991 | Smith |
| 5,019,996 A | 5/1991 | Lee |
| 5,056,720 A | 10/1991 | Crum et al. |
| 5,063,350 A | 11/1991 | Hemming et al. |
| 5,067,434 A | 11/1991 | Thur et al. |
| 5,080,289 A | 1/1992 | Lunzer |
| 5,093,625 A | 3/1992 | Lunzer |
| 5,107,438 A | 4/1992 | Sato |
| 5,121,884 A | 6/1992 | Noakes |
| 5,121,905 A | 6/1992 | Kniepkamp |
| 5,138,513 A | 8/1992 | Weinstein |
| 5,159,544 A | 10/1992 | Hughey et al. |
| 5,222,663 A * | 6/1993 | Noakes et al. ................ 239/3 |
| 5,267,138 A | 11/1993 | Shores |
| 5,340,289 A | 8/1994 | Konieczynski et al. |
| 5,351,903 A | 10/1994 | Mazakas et al. |
| 5,433,387 A | 7/1995 | Howe et al. |
| 5,457,621 A | 10/1995 | Munday et al. |
| 5,566,042 A | 10/1996 | Perkins et al. |
| 5,665,279 A | 9/1997 | Takehara et al. |
| 5,745,358 A | 4/1998 | Faulk |
| 5,818,709 A | 10/1998 | Takehara |
| 5,939,993 A | 8/1999 | Burrtin et al. |
| 5,947,377 A | 9/1999 | Hansinger et al. |
| 5,978,244 A | 11/1999 | Hughey |
| 6,144,570 A * | 11/2000 | Hughey ...................... 363/97 |

* cited by examiner

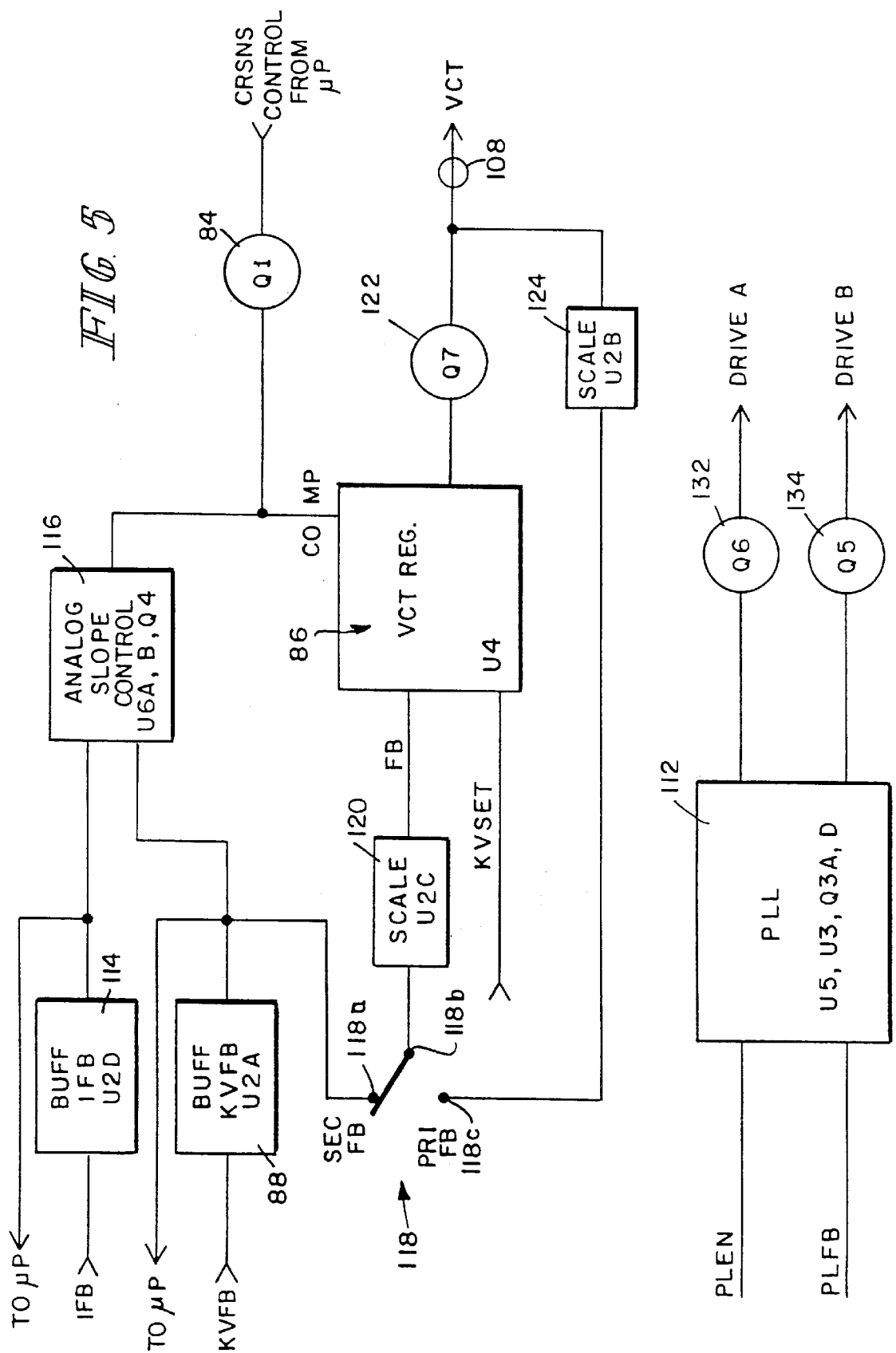

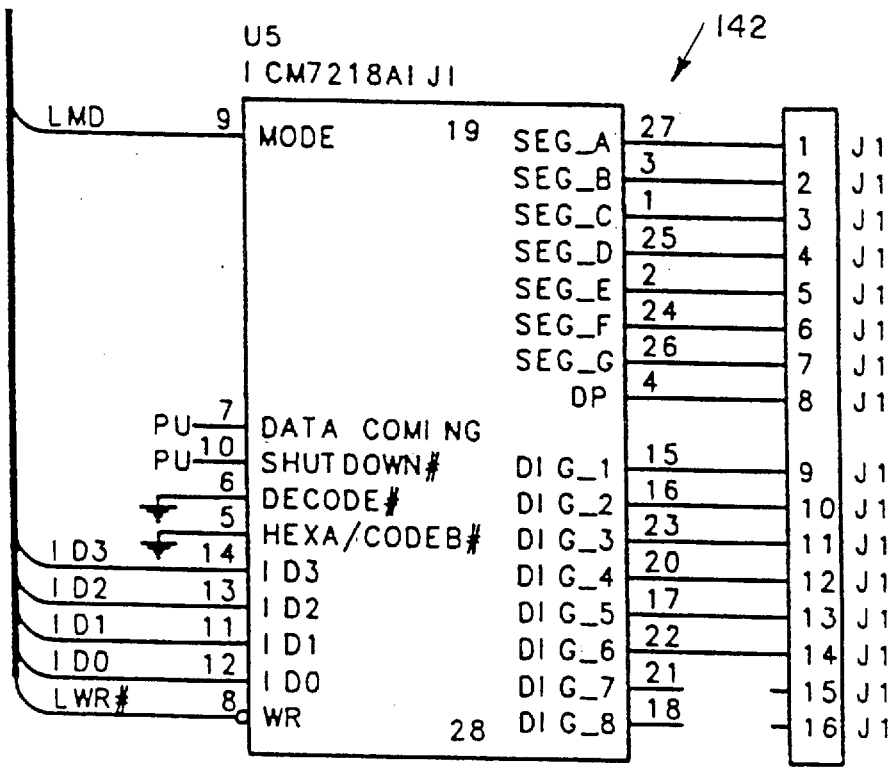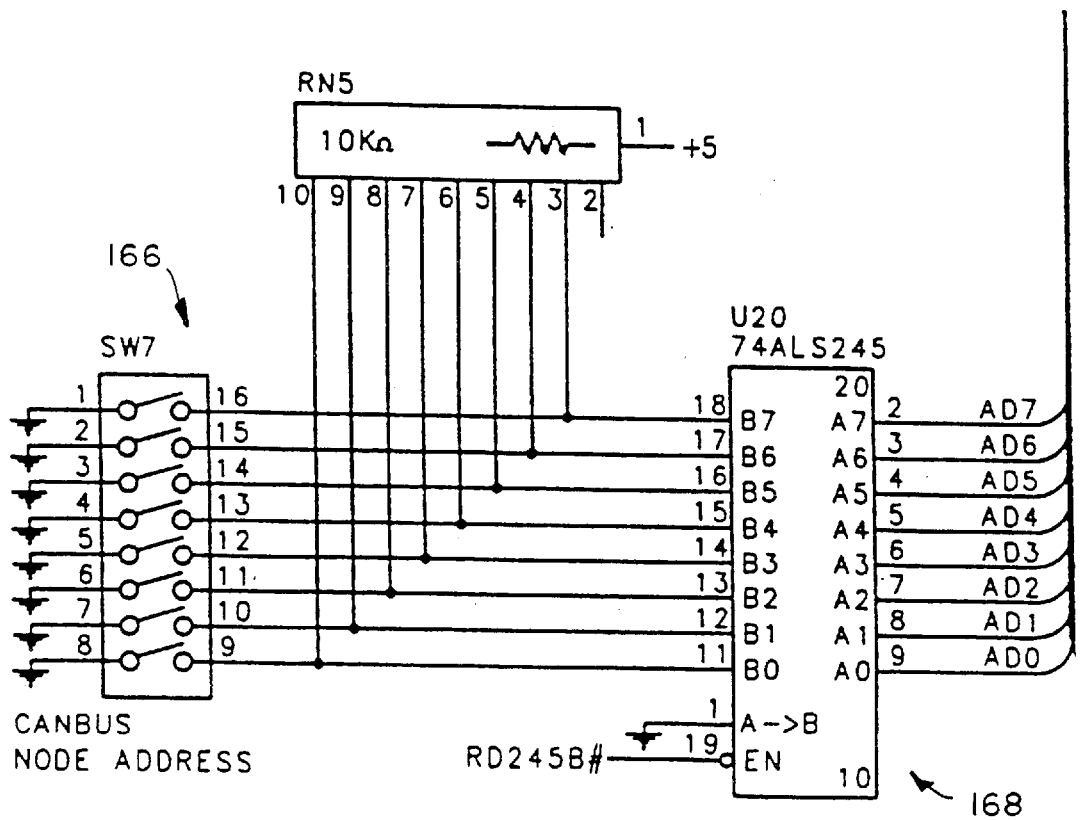
FIG. 6e

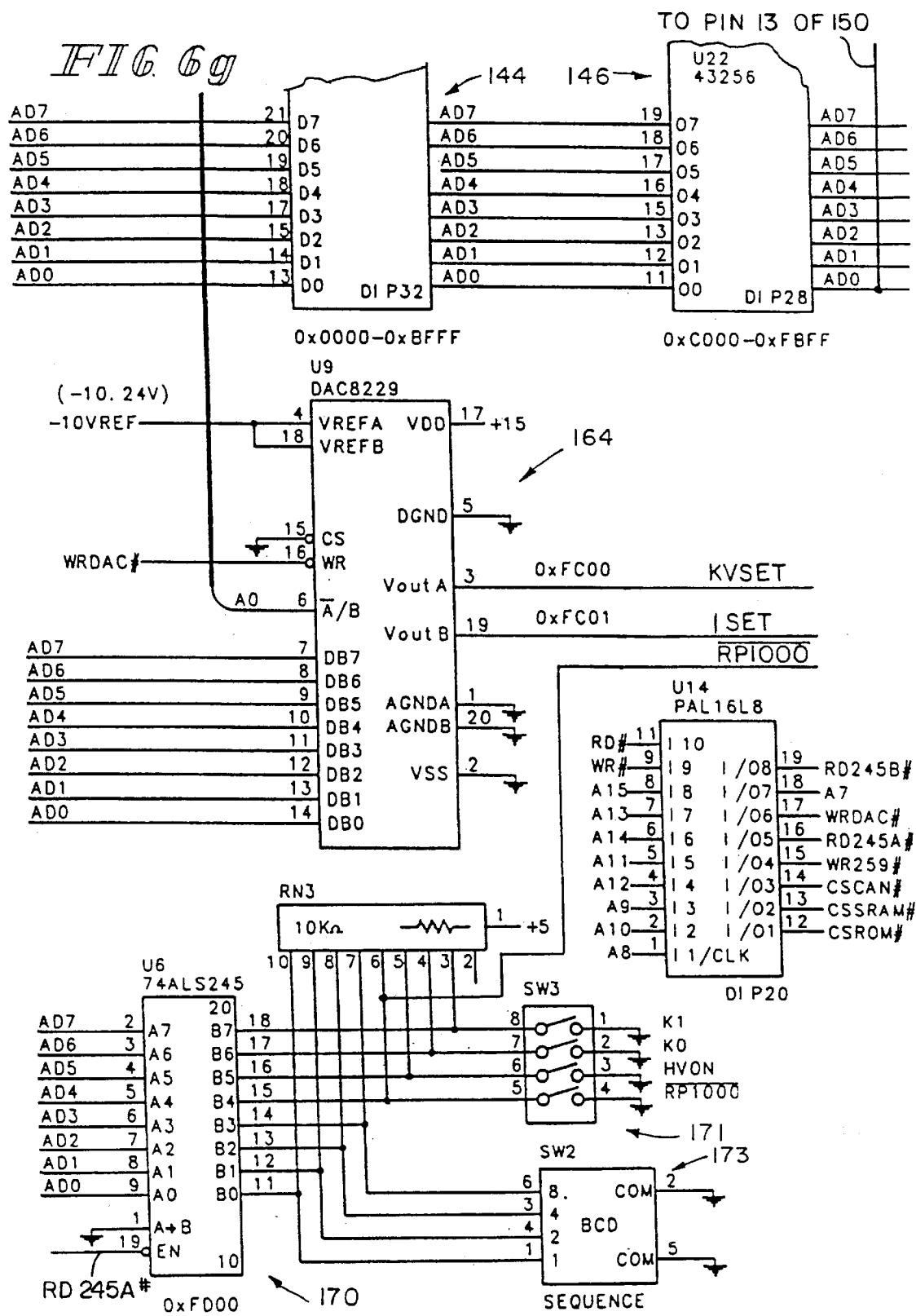

POWER SUPPLY CONTROL SYSTEM

This is a divisional application of U.S. Ser. No. 08/953,858, filed Oct. 16, 1997, the disclosure of which is incorporated herein by reference.

BACKGROUND OF THE INVENTION

This invention relates to controllers for high magnitude potential sources used in, for example, electrostatically aided coating material atomization and dispensing devices. Many such systems are known. There are, for example, the systems illustrated and described in U.S. Pat. Nos.: 3,851,618; 3,875,892; 3,894,272; 4,075,677; 4,187,527; 4,324,812; 4,481,557; 4,485,427; 4,745,520; and, 5,159,544, to identify but a few.

DISCLOSURE OF THE INVENTION

According to the invention, a high magnitude potential supply comprises a first circuit for generating a first signal related to a desired output high magnitude potential across a pair of output terminals of the supply, a second circuit for generating a second signal related to an output current from the high magnitude potential supply, and a third circuit for supplying an operating potential to the high magnitude potential supply so that it can produce the high magnitude operating potential. The third circuit has a control terminal. A fourth circuit is coupled to the first and second circuits and to the control terminal. The fourth circuit receives the first and second signals from the first and second circuits and controls the operating potential supplied to the high magnitude potential supply by the third circuit. A fifth circuit is provided to selectively disable the supply of operating potential to the high magnitude potential supply so that no high magnitude operating potential can be supplied by it. The fifth circuit is also coupled to the control terminal.

Illustratively, the first and second circuits comprise a programmable logic controller (PLC), and a high speed bus for coupling the PLC to the fourth circuit.

Additionally illustratively, the first and second circuits respectively comprise first and second potentiometers for selecting a desired output high magnitude potential and output current, respectively, and conductors for coupling the first and second potentiometers to the fourth circuit.

Further illustratively, first and second switches selectively couple one of the PLC and the first potentiometer, and one of the PLC and the second potentiometer, respectively, to the fourth circuit.

Additionally illustratively according to the invention, the third circuit comprises a high magnitude potential transformer having a primary winding and a secondary winding. The primary winding has a center tap and two end terminals. Third and fourth switches are coupled to respective ones of the end terminals. A source of oppositely phased first and second switching signals controls the third and fourth switches, respectively.

Illustratively, the fourth circuit comprises a switching regulator having an input terminal forming a summing junction for the first signal and the second signal and a output terminal coupled to the center tap. The fifth circuit includes a microprocessor ($\mu P$) and a fifth switch coupled to the $\mu P$ to receive a third switching signal from the $\mu P$. The fifth switch is coupled to the summing junction to couple the third switching signal to the switching regulator to disable the supply of operating potential to the center tap.

Illustratively, the fifth switch is coupled to the summing junction through a filter which smooths the switching signals generated by the fifth switch in response to the $\mu P$'s control.

Further illustratively, the apparatus comprises a sixth circuit cooperating with the $\mu P$ to determine if operating potential is being supplied to the high magnitude potential supply, and a seventh circuit cooperating with the $\mu P$ to determine if the high magnitude potential supply is indicating that it is generating high magnitude potential. The $\mu P$ indicates a fault if the operating potential is not being supplied to the high magnitude potential supply and the high magnitude potential supply is indicating that it is generating high magnitude potential. Illustratively, the $\mu P$ also indicates a fault if the operating potential is being supplied to the high magnitude potential supply and the high magnitude potential supply is indicating that it is not generating high magnitude potential.

BRIEF DESCRIPTION OF THE DRAWINGS

The invention may best be understood by referring to the following detailed description and accompanying drawings which illustrate the invention. In the drawings:

FIGS. 3–5, 6a–i, 7a–f and 8 illustrate, in block and schematic form, circuits useful in understanding the invention.

DETAILED DESCRIPTION OF AN ILLUSTRATIVE EMBODIMENT

In the detailed descriptions that follow, several integrated circuits and other components are identified, with particular circuit types and sources. In many cases, terminal names and pin numbers for these specifically identified circuit types and sources are noted. This should not be interpreted to mean that the identified circuits are the only circuits available from the same, or any other, sources that will perform the described functions. Other circuits are typically available from the same, and other, sources which will perform the described functions. The terminal names and pin numbers of such other circuits may or may not be the same as those indicated for the specific circuits identified in this application.

Figure 1:
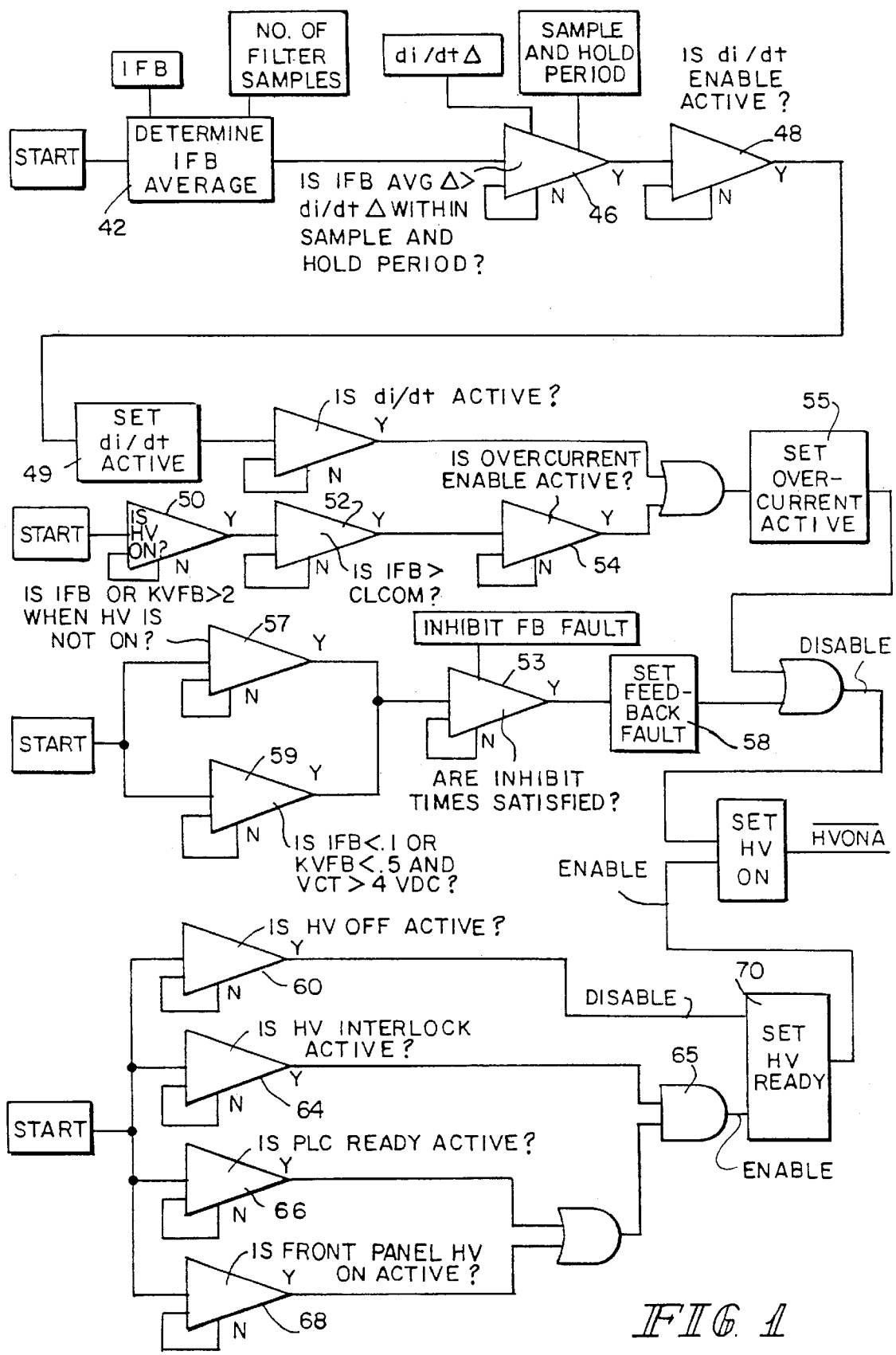
FIGS. 1–2 illustrate flow diagrams useful in understanding the invention.
Figure 3:
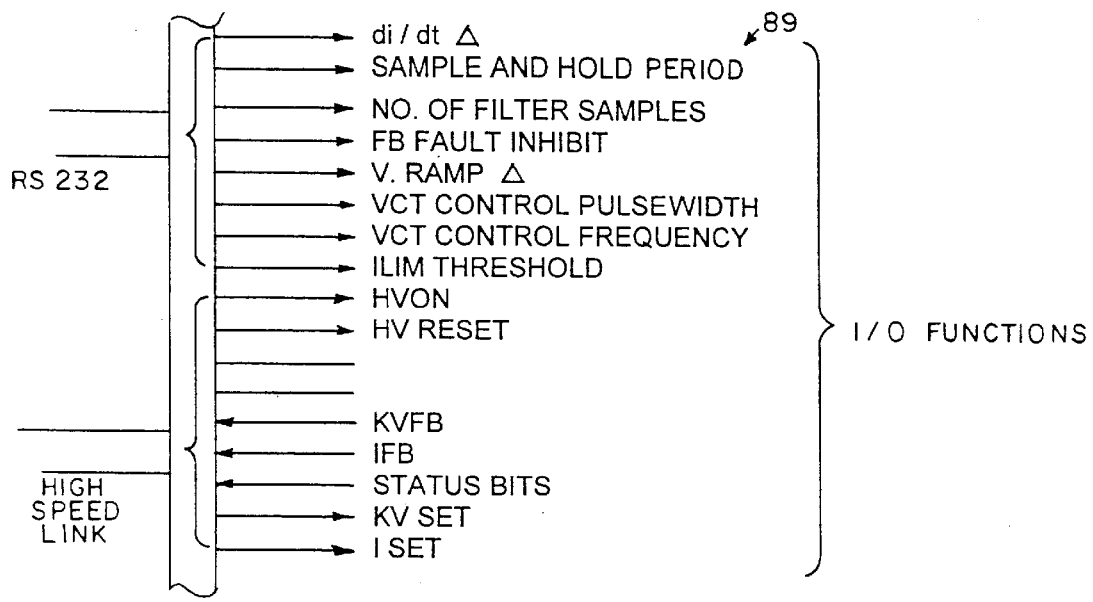

Flow diagrams of the routines which are executed by the $\mu P$ 40 are illustrated in FIGS. 1–4. Referring particularly to FIG. 1, high voltage power supply ground return current feedback, IFB, and a number of filter samples are provided to a function 42 which calculates a current feedback average, IFB AVeraGe from these variables. A di/dt $\Delta$ setting is provided to the $\mu P$ 40 from a display/set functions routine 44. di/dt $\Delta$ and the length of a sample and hold period are provided to a decision block 46 which determines whether the change in IFB average, IFB AVG $\Delta$, over the sample and hold period is greater than di/dt $\Delta$. This decision block 46 continues to be interrogated until IFB AVG$\Delta$ is greater than di/dt $\Delta$ over the sample and hold period. Once this result is achieved, the routine next determines 48 if di/dt enable is active. This decision block 48 continues to be interrogated until di/dt enable is detected active. Once this decision 48 is achieved, di/dt is set active at 49.

Another routine includes a decision block 50, "is High Voltage on?" This decision block 50 continues to be interrogated until HV is detected on. Once HV on is detected, a decision block 52 is reached, "is IFB greater than Current Limit COMmand?" Decision block 52 continues to be interrogated until IFB greater than CLCOM is detected. A decision block 54 is then reached, "is overcurrent enable active?" Decision block 54 continues to be interrogated until overcurrent enable is detected active. Once either di/dt or overcurrent enable is achieved, overcurrent is set active at 55.

Another decision that will disable HV On will now be explained. There are certain occurrences in the feedback paths for output high voltage and ground return current to the high voltage supply that the system interprets as feedback faults. If any of these faults occurs, the system is disabled by the µP 40. In the illustrated system, if IFB is greater than 2 µA or KiloVoltFeedBack is greater than 2 KV, 57, after a preselected INHIBIT time interval 53 after initialization of the system, the µP 40 interprets 58 this occurrence as a feedback fault and disables the system. This corresponds to the situation of an output with no input. Similarly, if IFB is less than 0.1 µA or KVFB is less than 0.5 KV and the Voltage at the Center Tap of the high magnitude potential supply input transformer is greater than 4 volts DC, 59, after the passage of the INHIBIT interval, the µP interprets 58 this occurrence as a feedback fault and disables the system. This corresponds to the situation of an input with no output.

Assuming that HV On is not disabled by either of these routines, the µP 40 determines 60 if HV Off is active. This decision block 60 continues to be interrogated until HV Off is detected active. Once HV Off is detected active, Set HV On is disabled at 62. If HV On is not disabled along one of these paths, the µP 40 next determines 64 if the system's Interlock is active. This decision block 64 continues to be interrogated until the interlock is detected active. The interlock active decision 64 gates 65 either the "Is Programmable Logic Controller Ready Active?" decision 66 or the "Is Front Panel HV On Active?" decision 68. Gating of either of these decisions 66, 68 by "Is Interlock Active?" 64 results 70 in the Setting of HV Ready. This results 72 in the Setting of HV On unless Set HV On has been disabled by Set Overcurrent Active 55 or Set FeedBack Fault 58.

Figure 2:
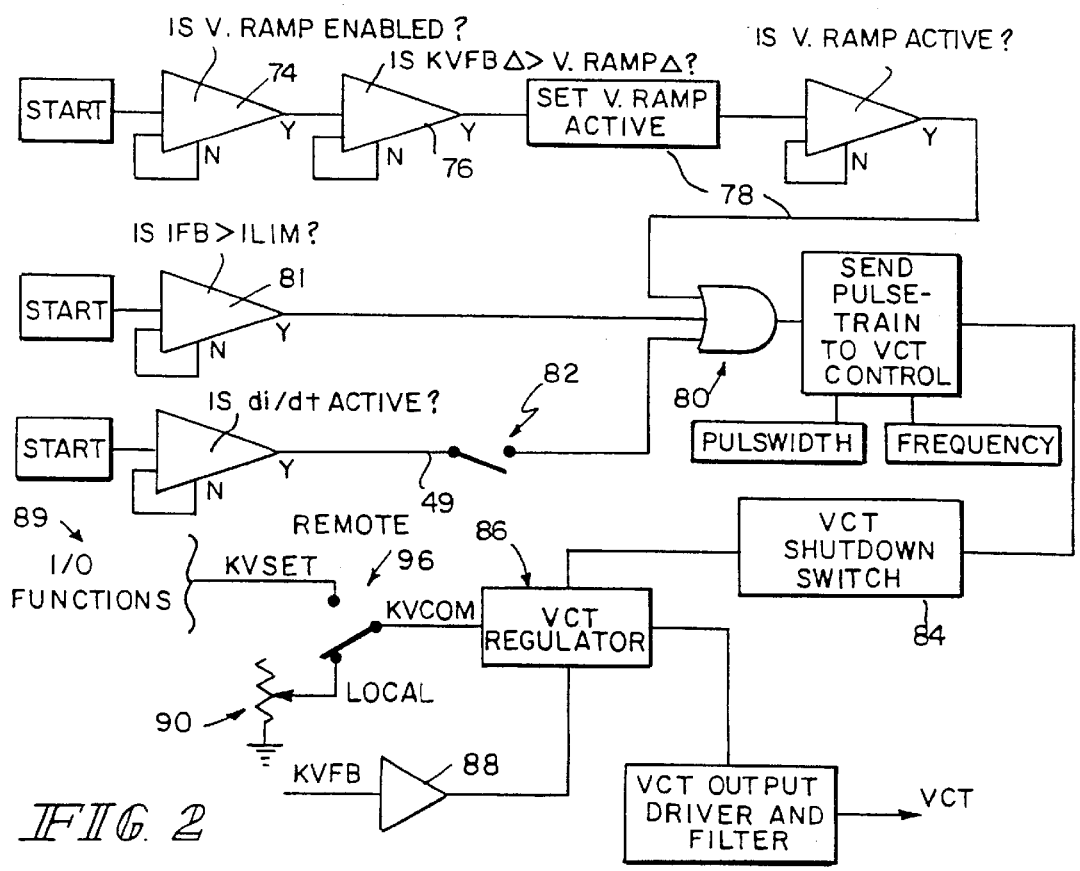

Turning now to the regulation of the Voltage at the Center Tap, and with reference to FIG. 2, the µP 40 first determines 74 if the function Voltage Ramp is enabled. This decision block 74 continues to be interrogated until V.Ramp is enabled. Once V.Ramp is enabled, the µP 40 next determines 76 if KVFB Δ is greater than V.Ramp Δ. This decision block 76 continues to be interrogated until KVFB Δ is greater than V.Ramp Δ. Once this decision is detected, V.Ramp is set active at 78. This is one way that pulses can be furnished to the V Center Tap controller 80.

Pulses will also be sent to VCT controller 80 if the feedback current IFB is greater than the feedback current limit, I LIMit. This decision block is illustrated at 81. A third way in which pulses will be sent to the VCT controller 80 is if di/dt is active. This decision is illustrated at 49. This state is detected as described above in connection with the discussion of FIG. 1. In the illustrated embodiment, this method may or may not be employed at the option 82 of the operator.

Pulses having pulsewidths and frequencies determined in a manner which will be described are supplied to the VCT shutdown switch 84. The output from the VCT shutdown switch 84 is an input to the VCT regulator IC 86. Other inputs to the VCT regulator IC 86 include the KVFB signal buffered by the KVFB buffer 88, and a commanded KV setting. Commanded KV COM may come from either of two sources, a KV adjust potentiometer 90 on the front panel of the apparatus or from a PLC as one of the I/O functions 89. See also FIG. 3. To select KV adjust from among the I/O functions, the operator needs to select the remote position of a local/remote switch 96 on the front panel.

Figure 4:
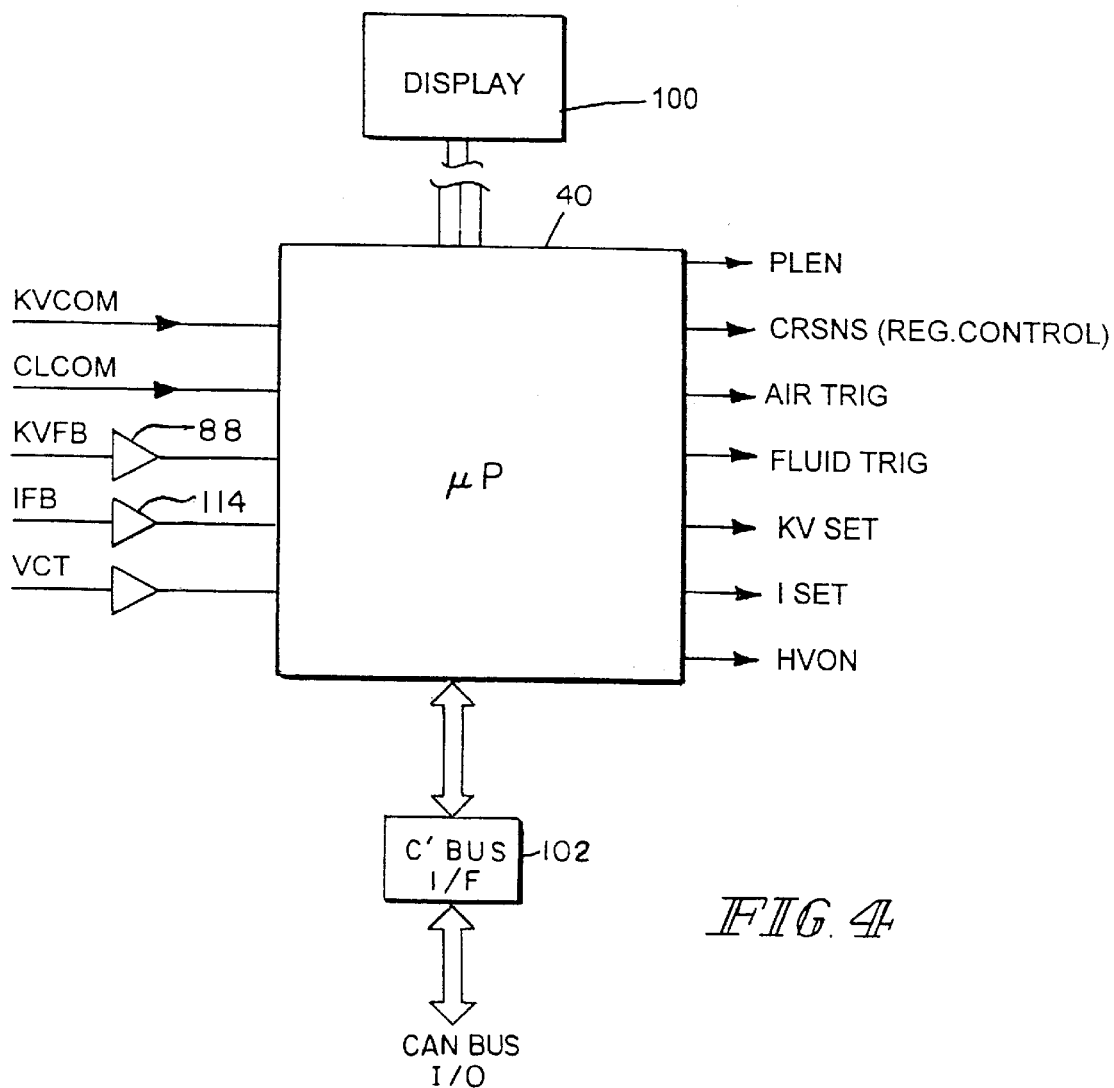

Turning now to the block diagrams of the two printed circuit boards that comprise the system, the µP board, FIG. 4, includes the µP 40 itself, a display 100 and a high speed network I/O 102, such as a standard Control Area Network BUS (CANBUS) I/O. µP 40 illustratively is a type 80C196KB-12 µP. The µP 40 AID converts several inputs, including: the commanded KV setting, KVCOM, from the front panel; the commanded high magnitude potential supply output current limit, Current Limit COMmand, from the front panel; the KV FeedBack signal from the output of the high magnitude potential supply; the ground return current feedback, IFB, at the high magnitude potential supply's ground connection; and, the magnitude of the center tap voltage, VCT, to the primary winding of the high magnitude potential supply's high voltage transformer. The µP 40 generates from these inputs and others outputs including: a Phase Lock ENable signal to enable the high magnitude potential supply's phase locked loop oscillator 112; a Corona SSeNSe signal to the VCT regulator 86; an Air Trigger control to trigger the flow of, for example, atomizing or shaping air to a pneumatically assisted atomizer 113 (FIG. 8), such as an automatic gun-type atomizer, or a rotary atomizer such as a bell- or disk-type atomizer; a Fluid Trigger control to trigger the flow of, for example, coating material or solvent during a coating operation or color change, respectively; KV Set, which will be either KVCOM in the local control mode or he output high magnitude voltage setting commanded by a PLC in the remote control mode; I Set which will be either CLCOM in the local control mode or the current setting commanded by a PLC in the remote control mode; and, the HV On signal which switches on the high magnitude potential supply 106 to the atomizing device 113.

Figure 8:
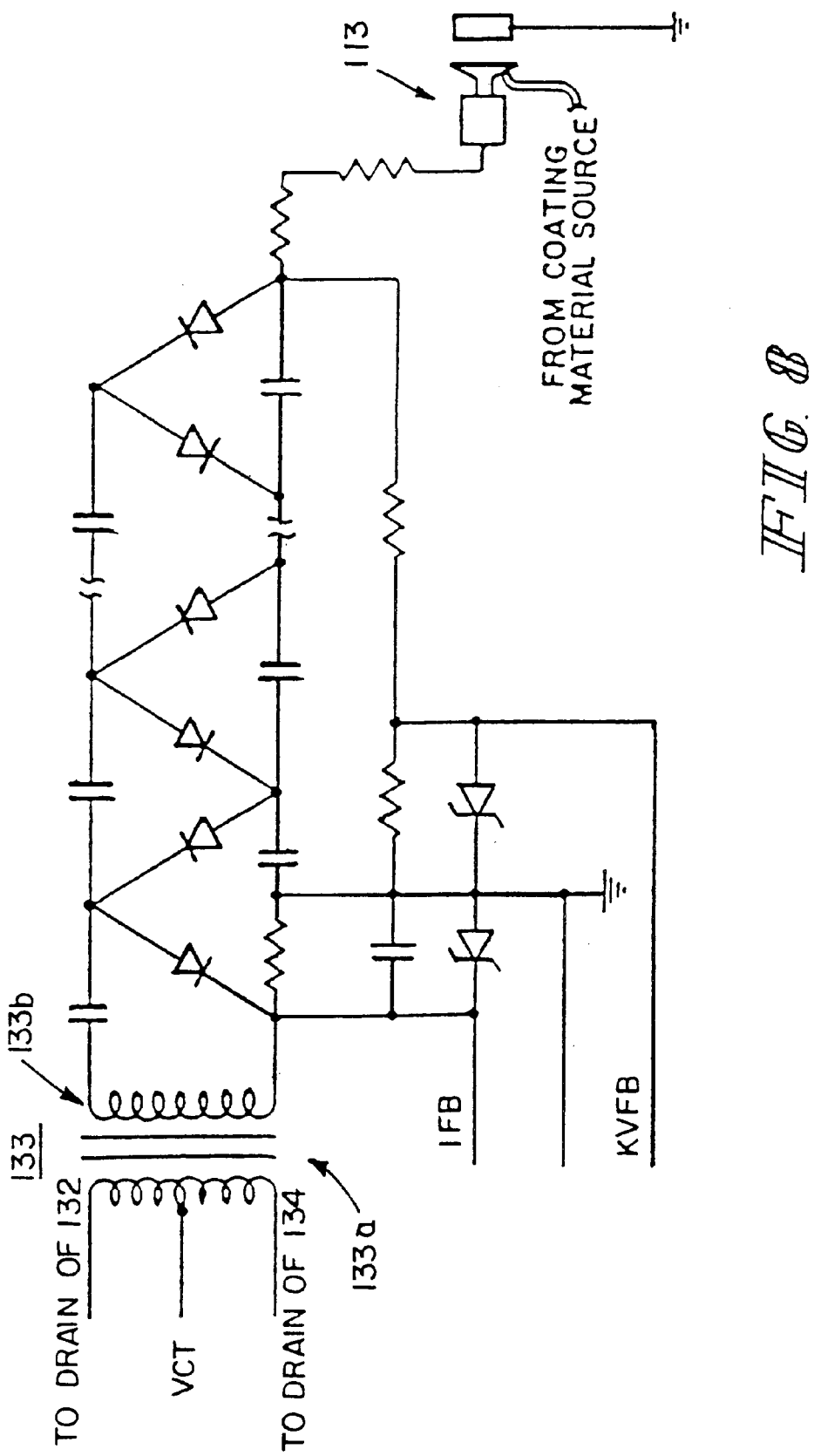

The output printed circuit board, FIG. 5, includes: a buffer amplifier 114 which receives the IFB signal and outputs the buffered IFB signal to the µP 40 and to an analog slope control circuit 116; and, buffer amplifier 88 which receives the KVFB signal and outputs the buffered KVFB signal to the µP 40, to the analog slope control circuit 116, and to one throw 118a of a single pole, double throw primary/secondary feedback select switch 118. The pole 118b of the switch 118 is coupled through a scaling amplifier 120 to the FeedBack terminal of the VCT regulator 86. The output board also includes a KV Set input to the VCT regulator 86. The output terminal of the VCT regulator 86 is coupled through a buffer 122 to the center tap 108 of the primary winding of the high magnitude potential transformer. This terminal is also coupled through a scaling amplifier 124 to the remaining throw 118c of feedback select switch 118. Thus, the operator has the ability to select 118b the source of the voltage feedback signal to the voltage feedback input terminal of the VCT regulator 86 the operator can select either the VCT input voltage, appropriately scaled by amplifier 124 appearing at terminal 118c, or the high magnitude potential supply's output voltage, KVFB appearing at terminal 118a. The output printed circuit board also includes the VCT shutdown switch 84 which disables the VCT regulator 86 by switching the COMPensating input terminal of the VCT regulator 86 in response to the Corona SSeNSe A signal from the µP 40. The output board also includes the phase locked loop high magnitude potential supply oscillator 112, with its Phase Lock ENable and Phase Lock FeedBack inputs and its amplified 132, 134 outputs A and B to the two ends of the high magnitude potential supply's input transformer 133 primary winding 133a (FIG. 8).

Figure 6A:
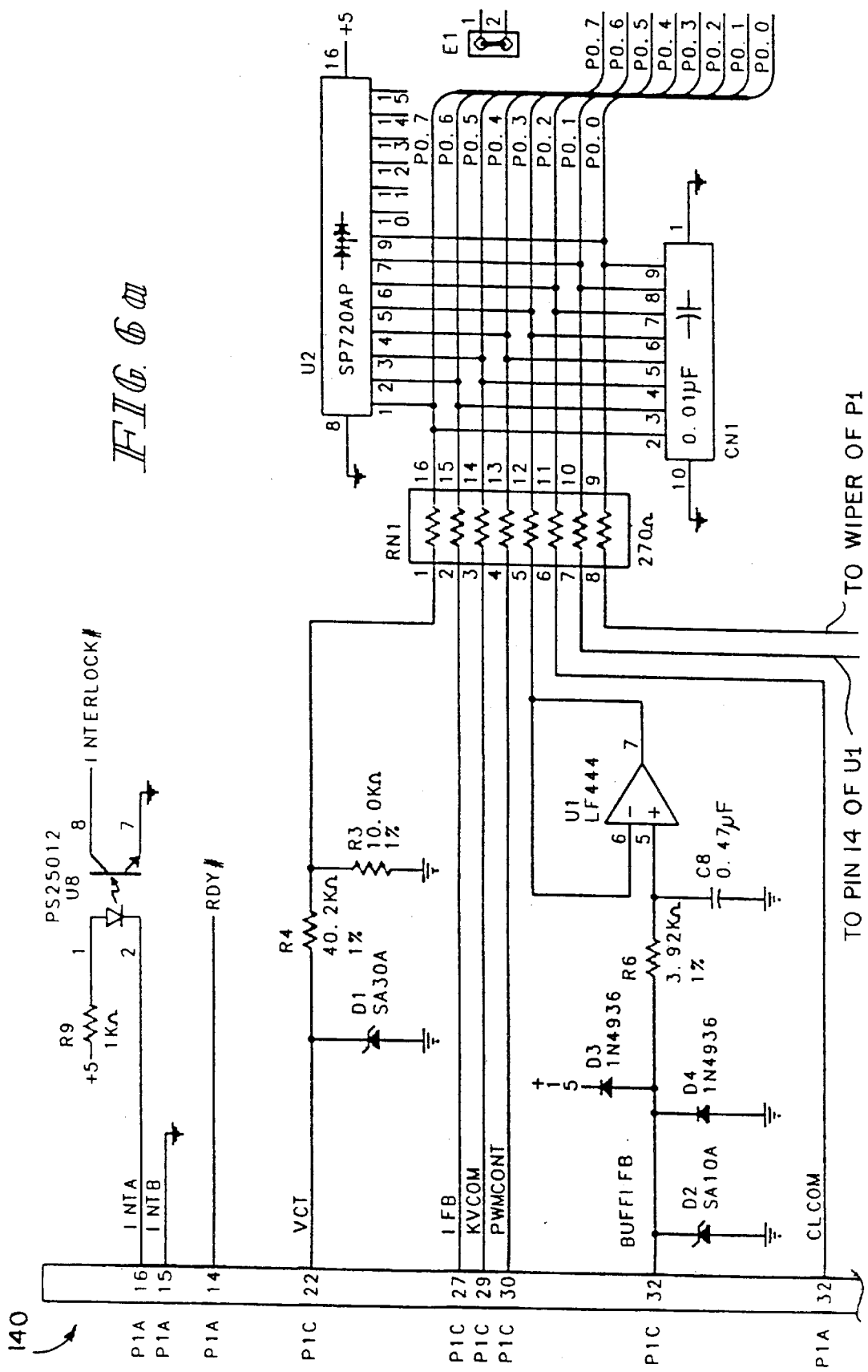
Figure 6B:
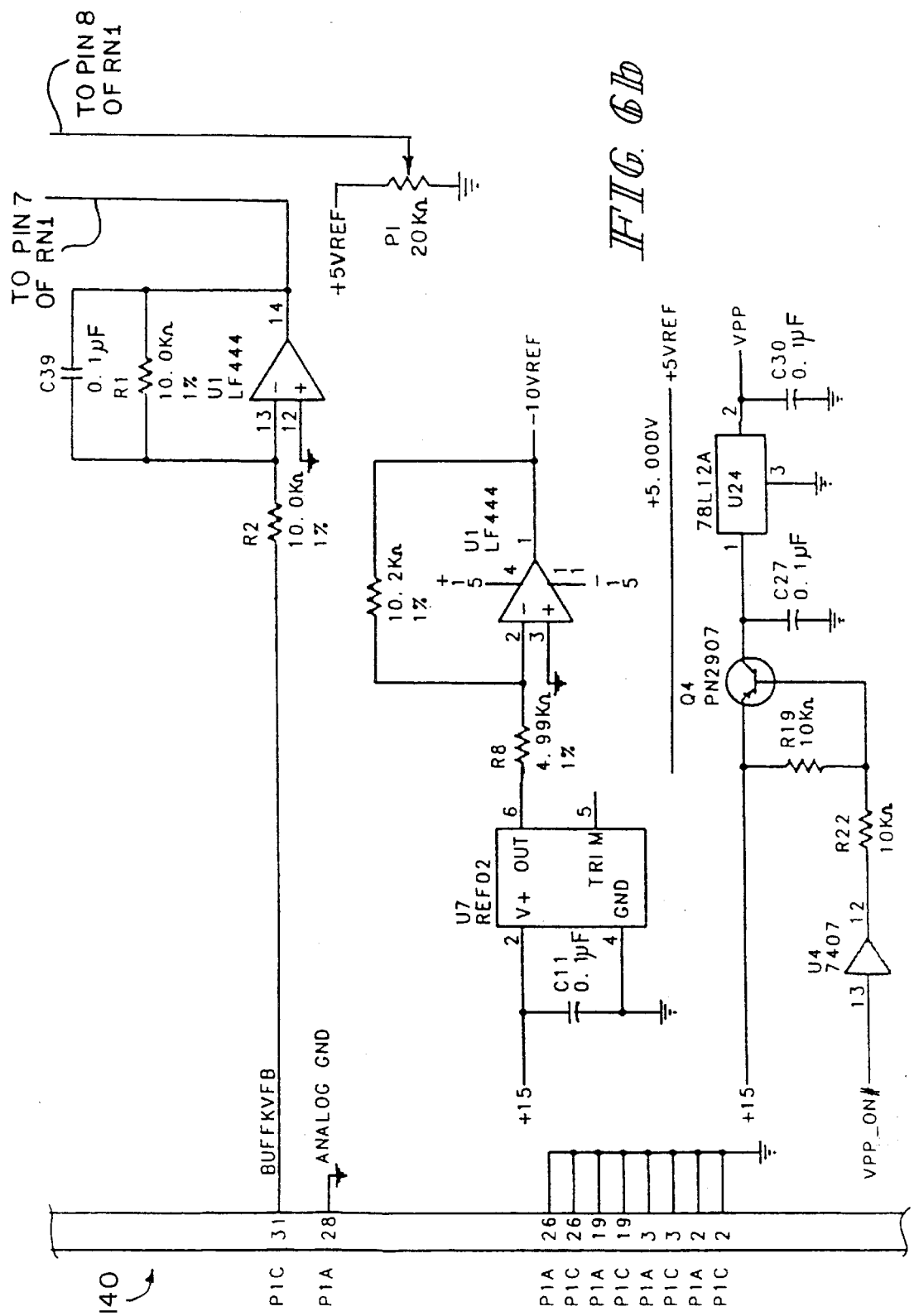
Figure 6C:
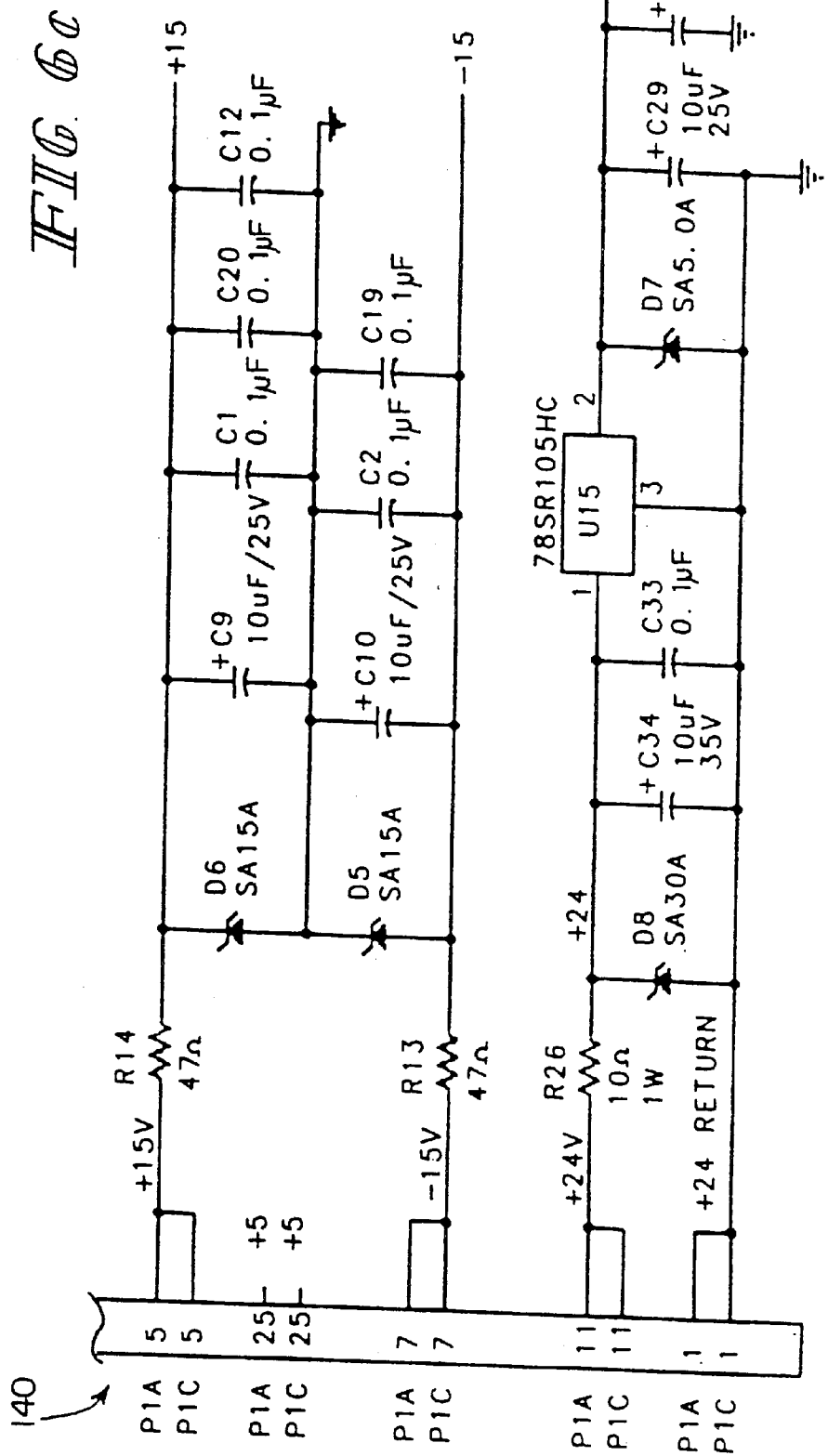
Figure 6D:
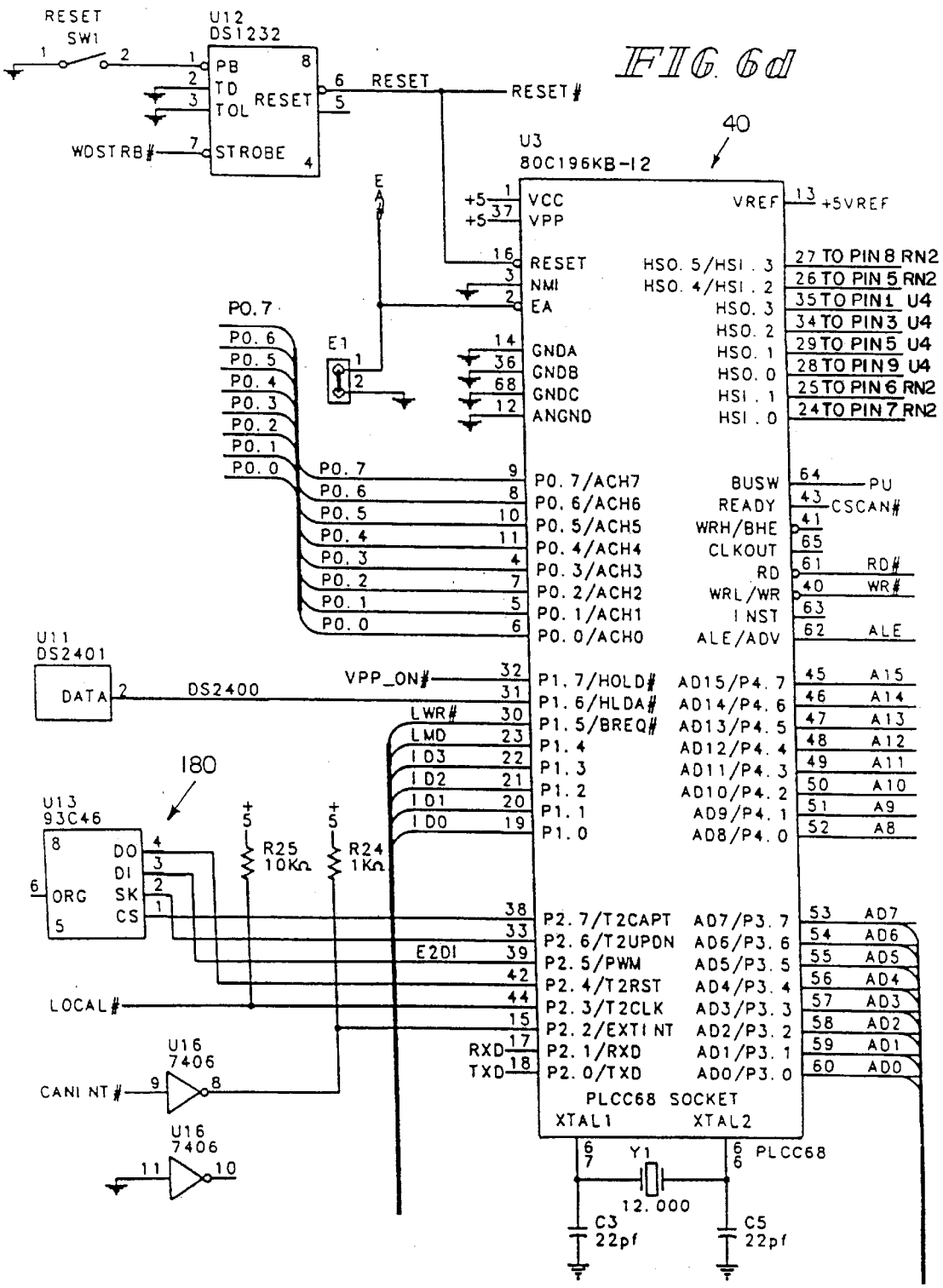

Turning now to FIGS. 6a–i, the partly block and partly schematic diagrams of the process board of the illustrated system, signals and operating potentials are coupled to and from the system's internal bus 140, FIGS. 6a–c. µP 40 includes an A/D port 0, FIG. 6*d*, which receives from bus 140 the VCT, IFB, KVCOM, PulseWidth Modulation CONTrol, BUFFered IFB, CLCOM, and BUFFered KVFB signals from the bus 140. These signals are applied through input circuitry including 270 Ω–0.01 $\mu$F RC circuits and back-to-back diode protection circuits to the P0.7–P0.1 terminals, respectively, of port 0. Display 100 is driven by a display driver 142, FIG. 6*e*, coupled between port 1 of $\mu$P 40 and display 100. Specifically, the P1.0–P1.5 terminals of $\mu$P 40 are coupled to the 1D0–1 D3, MODE, and Write terminals, respectively, of display driver 142. Display driver 142 illustratively is a type I CM7218A1 J1 display driver. The program executed by $\mu$P 40 is stored in an EPROM 144, FIGS. 6*f*–*g*. A static RAM 146 provides storage for the calculations made by $\mu$P 40, as well as for data passed back and forth to and from the a bus 148. EPROM 144 illustratively is a type 28F001BX EPROM. SRAM 146 illustratively is a type 43256 SRAM. The CANBUS I/O 102 includes a three-to-eight demultiplexer 150, FIG. 6*h*, whose outputs Q4–Q0 drive, among other things, the Corona SSeNSe A, Phase Lock ENable, FLuiD TRIGger, AIR TRIGger, and HVON A# lines, respectively, of the bus 148. Demultiplexer 150 illustratively is a type 74LS259 demultiplexer. The CANBUS I/O 102 also includes a serial-to-parallel/parallel-to-serial converter 154 and bus driver 156. The CAN+ and CAN− terminals of bus 148 are coupled to the BUS+ and BUS− terminals, respectively, of bus driver 156. The RX1 and RX0 terminals, respectively, of the S-P/P-S converter 154 are coupled to the REFerence and RX terminals, respectively, of the bus driver 156. The TX0 terminal of S-P/P-S converter 154 is coupled to the TX terminal of bus driver 156. S-P/P-S converter 154 illustratively is a type 82C200 S-P/P-S converter. The I/O functions include provisions for an RS232 interface. Consequently, the I/O also includes an RS232-toTTL/TTL-to-RS232 interface 160, FIG. 6*i*. The TXD and RXD lines, terminals P2.0 and P2.1, respectively, of $\mu$P 40 are coupled to the T2*i* and R2*o* terminals, respectively, of interface 160. The T2*o* and R2*i* terminals of interface 160 are coupled to the TX232 and RX232 lines, respectively, of the bus 148. Interface 160 illustratively is a type MAX232 interface.

Analog signals to the output board, FIGS. 7*a*–*d*, are generated by a D/A converter 164, FIG. 6*g*, whose input port DB0–DB7 is coupled to the P3.0–P3.7 terminals, respectively, of $\mu$P 40 via the system AD0–AD7 lines, respectively. The Vout A and Vout B terminals of D/A converter 164 form the KVSET and I SET lines, respectively, of the bus 148. D/A converter 164 illustratively is a type DAC8229 D/A converter. The node address of $\mu$P 40 on the CANBUS is established by an octal switch 166 and 10 KΩ pull-down resistors coupled via an octal latch 168 to the system AD0–AD7 lines. Octal latch 168 illustratively is a type 74ALS245 octal latch. The system is designed to control a number of different types of power supplies, some using high-Q high magnitude power supply input transformers 133 as taught in U.S. Pat. No. 5,159,544, and some using relatively lower-Q high magnitude power supply input transformers 133. The system needs to be able to identify the type of power supply it is controlling. A line, notRP1000 identifies the power supply being controlled by the illustrated system as one having a high-Q input transformer 133 or not. This line of the bus 148 instructs one bit of input to $\mu$P 40 via one switch of a quad switch 171. Another switch of quad switch 171 is the system's manual HV On switch. Another quad switch 173 controls the system's initialization sequence. These switches are coupled via an octal latch 170 to the system AD0–AD7 lines. Latch 170 illustratively is a type 74ALS245 octal latch. The AD0–AD7 lines are also coupled to the D0–D7 terminals, respectively, of EPROM 144, the O0–O7 terminals, respectively, of SRAM 146, and the AD0–AD7 terminals, respectively, of P-S/S-P converter 154.

Figure 6F:
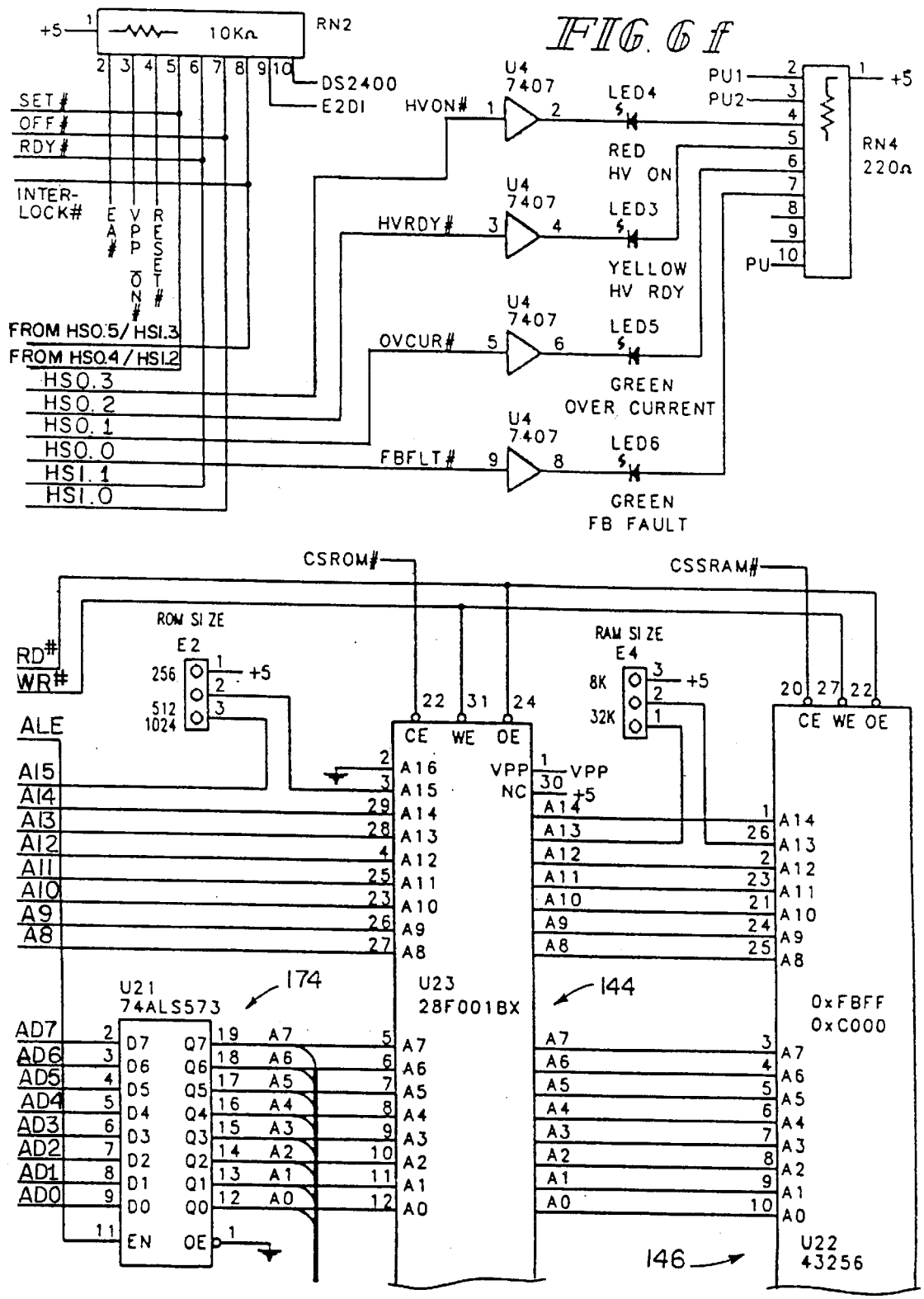
Figure 6H:
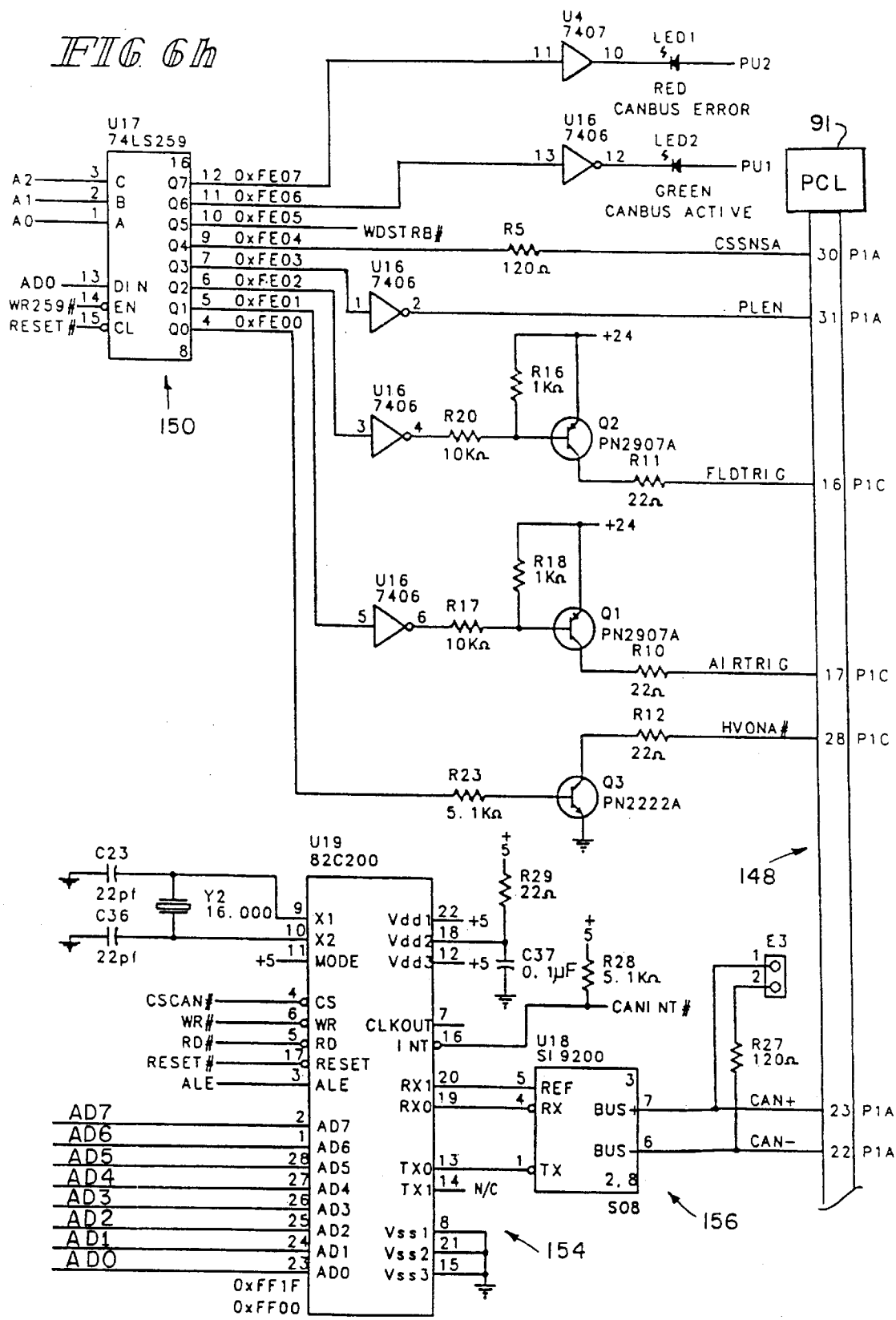
Figure 6I:
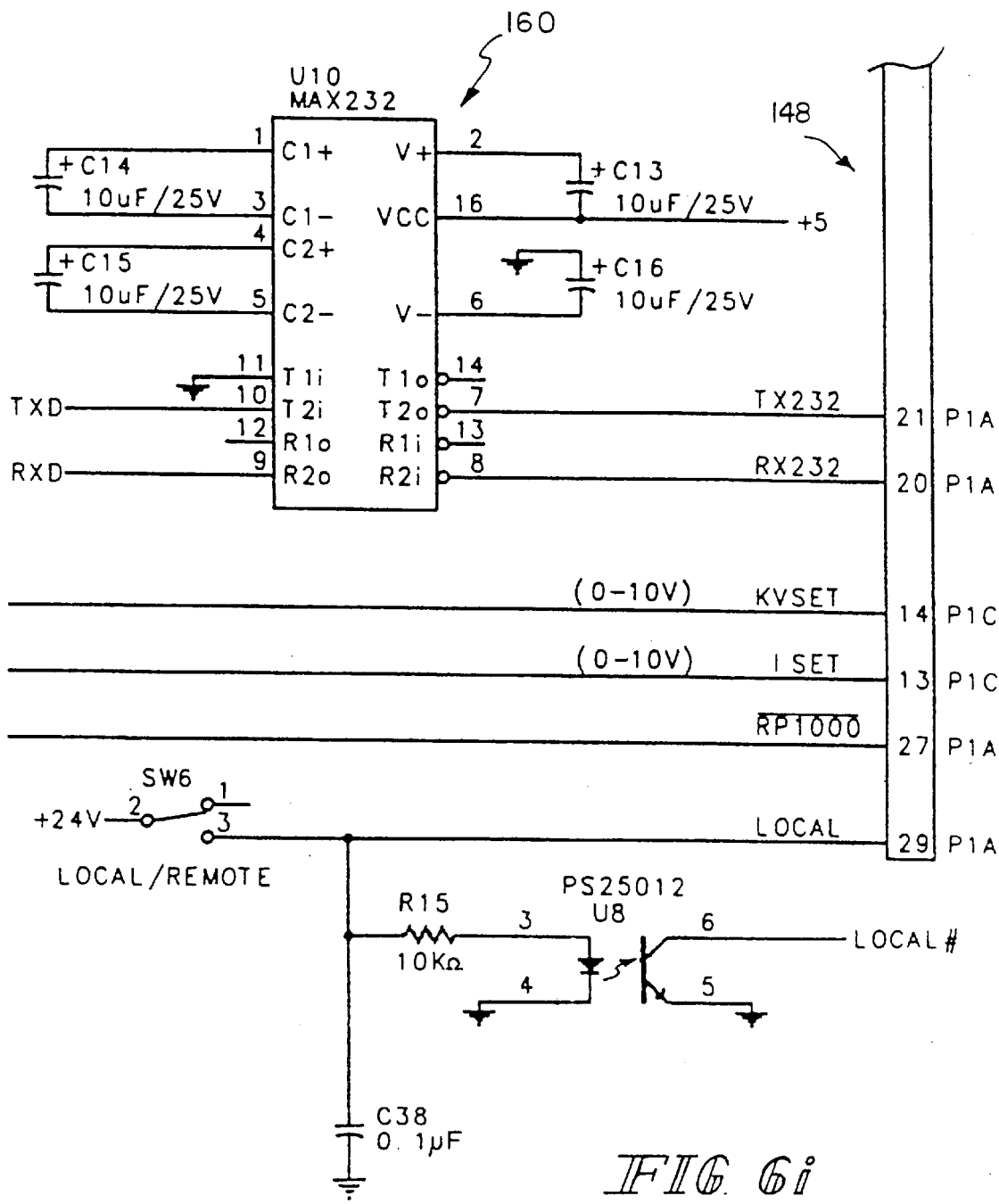

The AD0–AD7 lines are also coupled to the D0–D7 lines, respectively, of a buffer/latch 174, FIG. 6*f*. The output terminals Q0–O7 of buffer/latch 174 are coupled to the system A0–A7 lines, respectively. Buffer/latch 174 illustratively is a type 74ALS573 buffer/latch. The system A0–A7 lines are coupled to the A0–A7 terminals of EPROM 144, respectively, and to the A0–A7 terminals of SRAM 146, respectively. The P4.0–P4.7 terminals of $\mu$P 40 are coupled via the system A8–A15 lines, respectively, to the A8–A15 terminals, respectively, of EPROM 144, and the A8–A14 lines are also coupled to the A8–A14 terminals of SRAM 146, respectively. High Voltage On, High Voltage ReaDY, OverCURrent and FeedBack FauLT status is indicated to the operator by, among other things, LEDs coupled through appropriate amplifiers to respective ones of the HS0.3, HS0.2, HS0.1, HS0.0 terminals of $\mu$P 40. An EEPROM 180, FIG. 6*d*, containing initializing parameters for the $\mu$P 40 has its DO, DI, SK and CS terminals, respectively, coupled to the $\mu$P 40's P2.4–P2.7 terminals. EEPROM 180 illustratively is a type 93C46 EEPROM. CANBUS ACTIVE and CANBUS ERROR status is indicated by, among other things, LEDs coupled through appropriate amplifiers, FIG. 6*h*, to the Q6 and Q7 terminals, respectively, of demultiplexer 150.

Figure 7A:
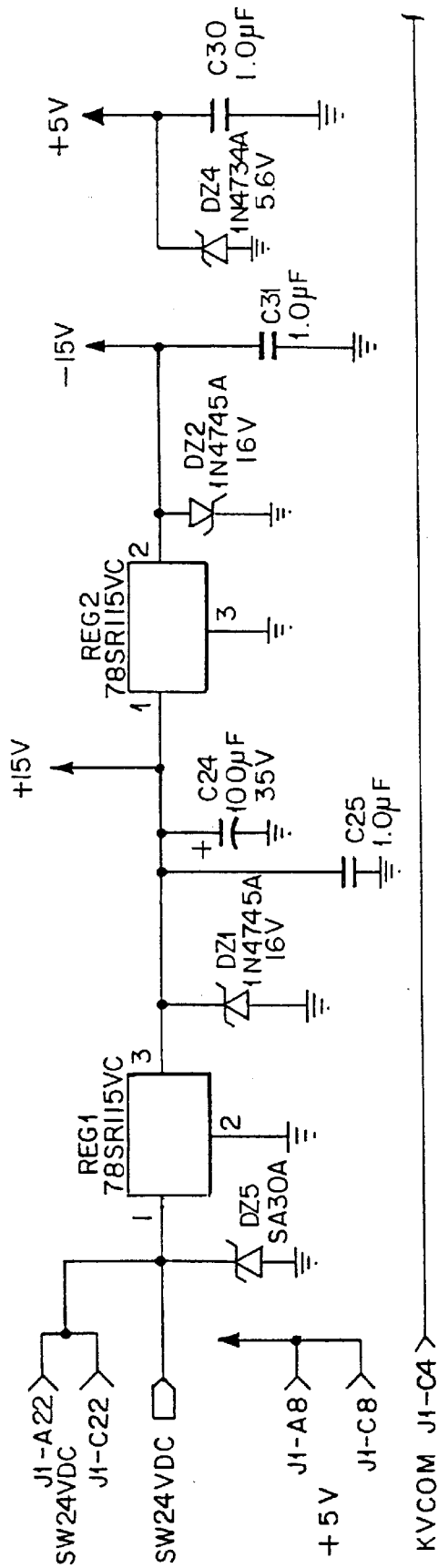
Figure 7B:
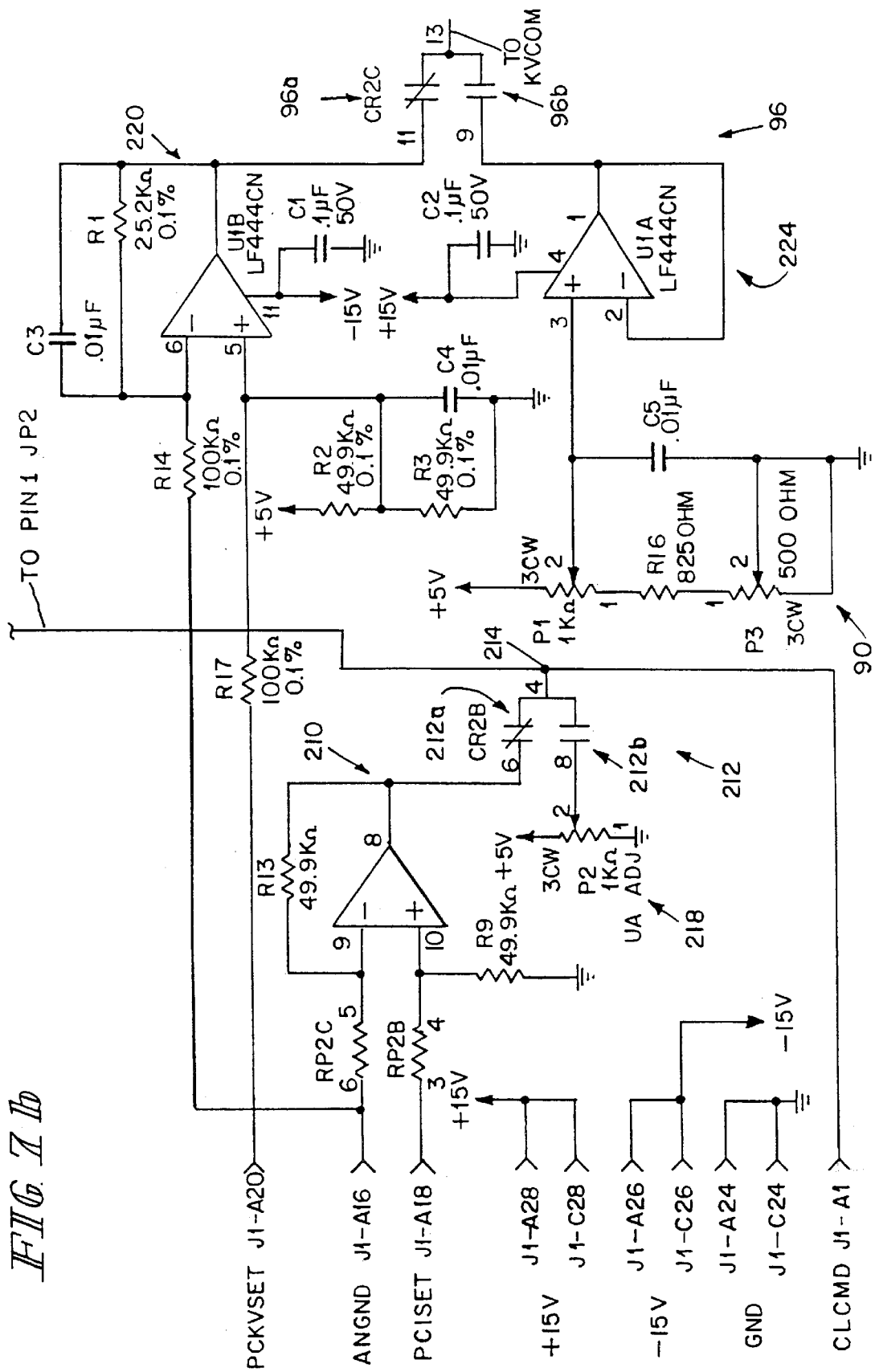
Figure 7C:
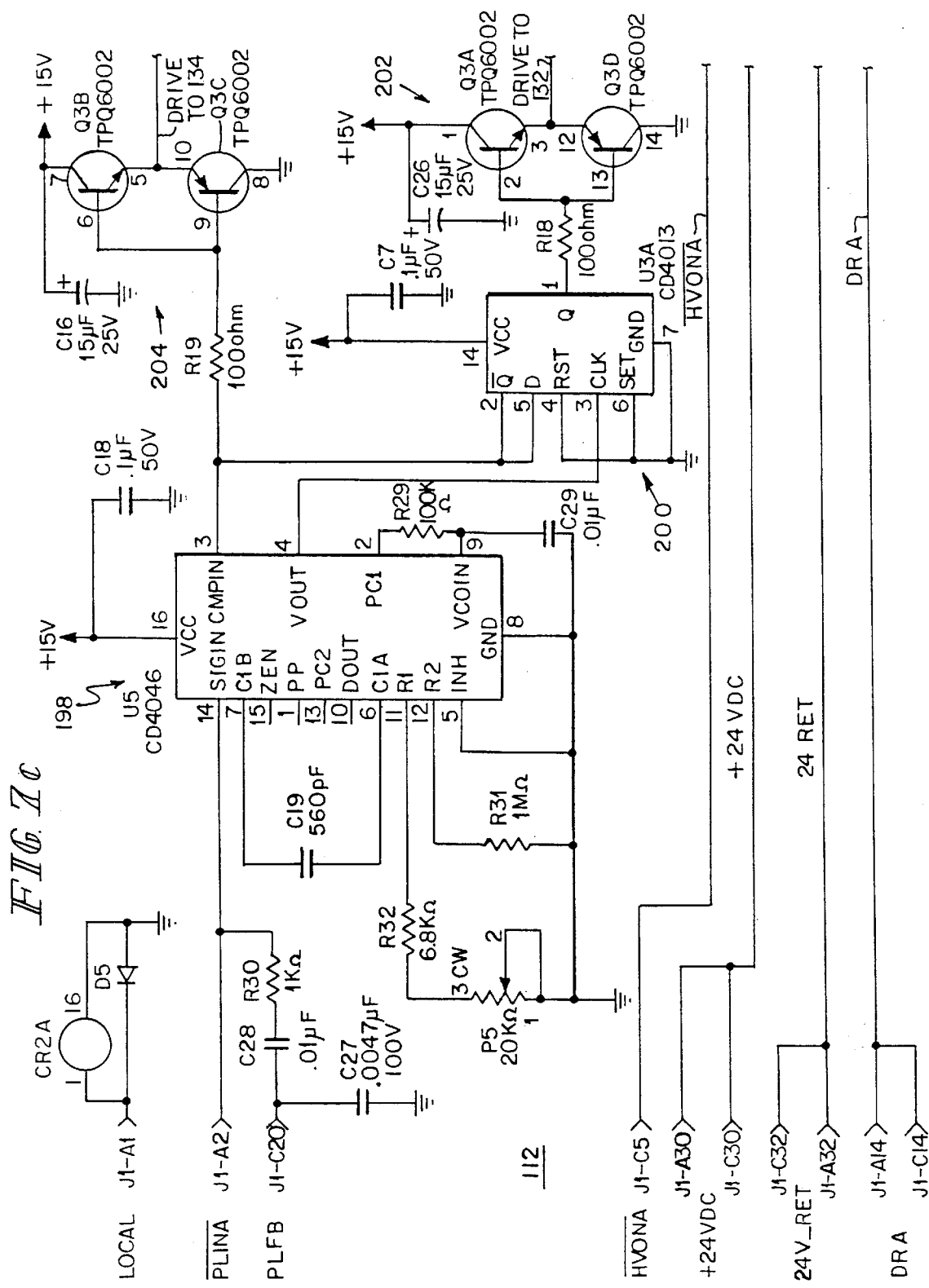
Figure 7D:
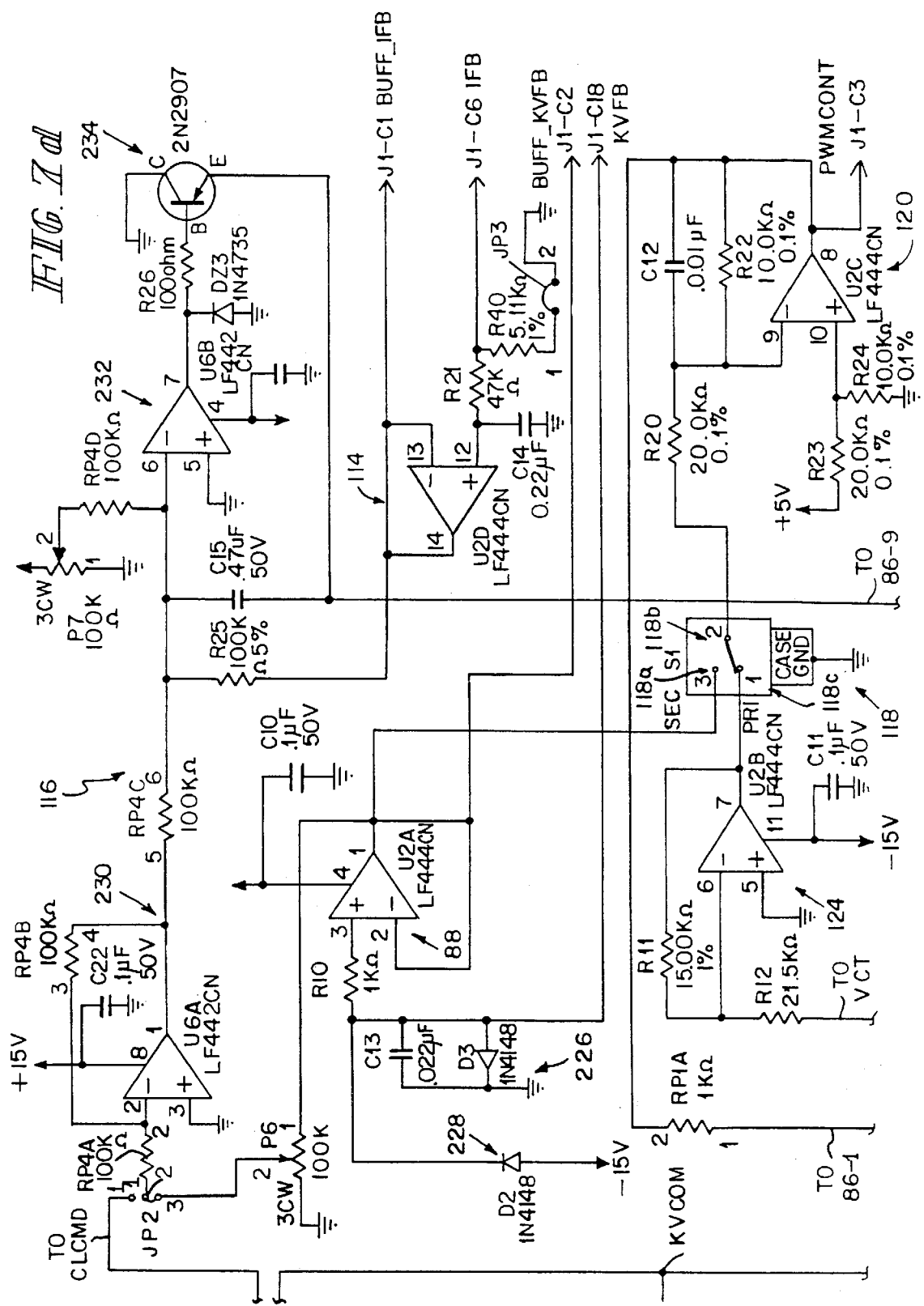
Figure 7E:
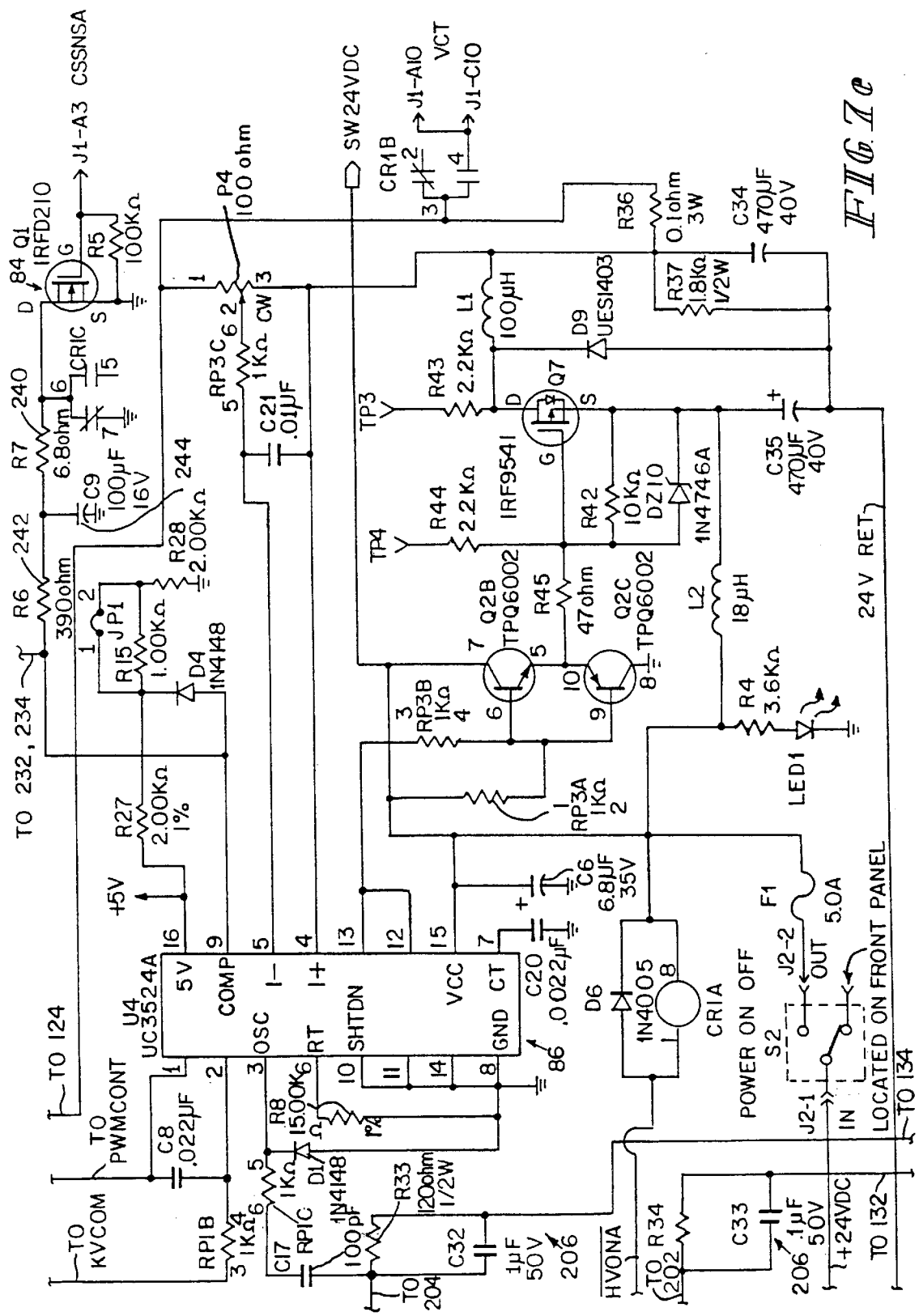
Figure 7F:
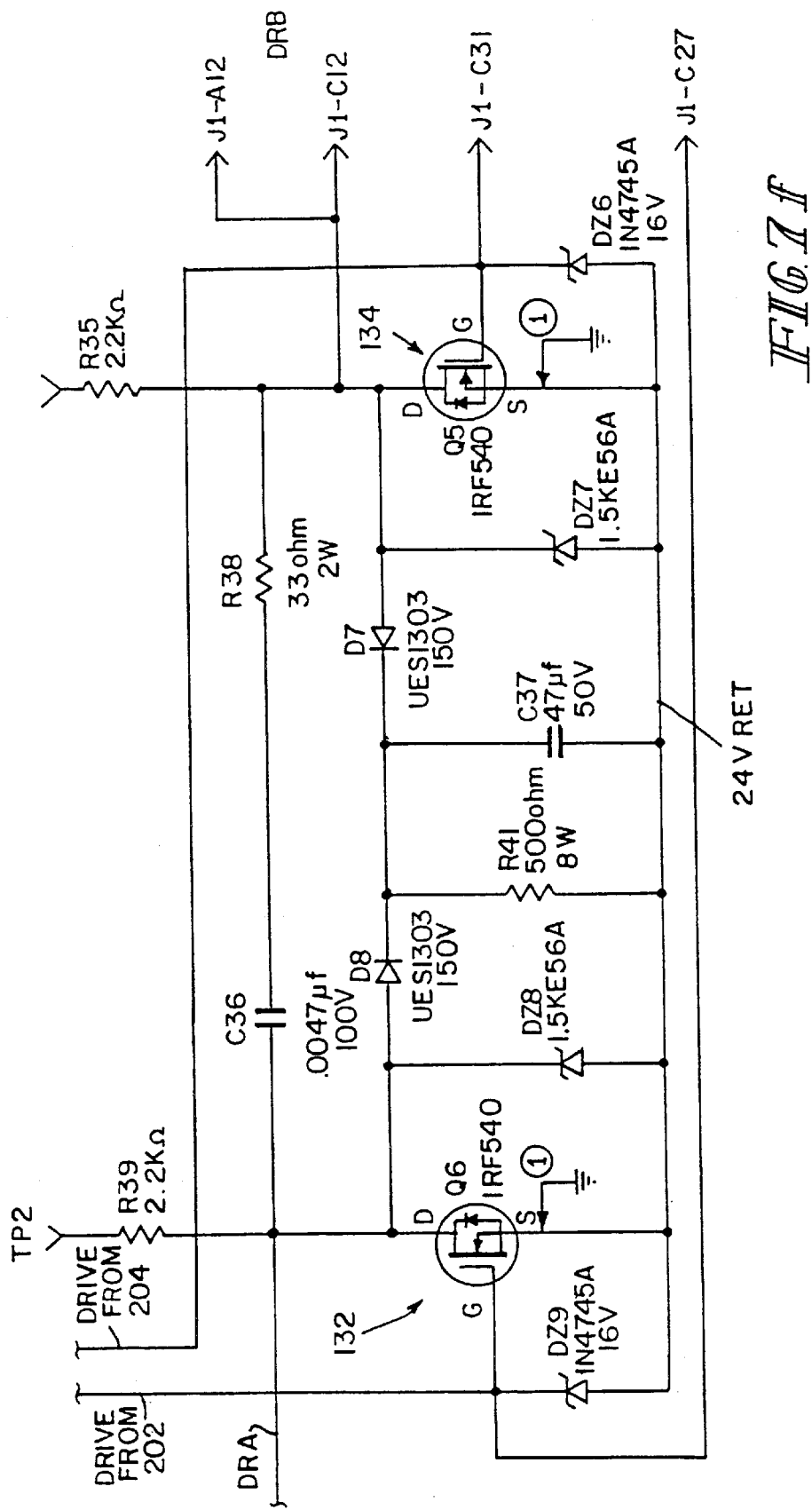

Referring now to FIGS. 7*a*–*f*, the output board includes a phase locked loop IC 198, FIG. 7*b*, and the A and B drive transistors FIG. 7*f*. The SIG IN input to the PLL IC 198 is the PhaseLock FeedBack signal shaped by an RC circuit including a 0.0047 $\mu$F capacitor to ground and the series combination of a 0.01 $\mu$F capacitor and a 1 KΩ resistor. The SIG IN input terminal of PLL IC 198 is also coupled to the not Phase Lock IN A signal line. PLL IC 198 illustratively is a type CD4046 PLL IC. Transistors 132, 134 illustratively are type IFR540 FETs. The drive signal for transistor 132 is output from the VOUT terminal of the PLL IC 198 to the ClocK input terminal of a D flip-flop 200. The oppositely phased Q and notQ outputs of DFF 200 are coupled to two pushpull configured predriver transistor pairs 202, 204, respectively, the outputs of which are coupled through respective wave-shaping parallel RC circuits 206 to the gates of the respective A and B drive transistors 132, 134. The drains of the respective A and B drive transistors 132, 134 are coupled to the opposite ends, the Drive A and Drive B terminals, respectively, of the primary winding 133*a* of the input transformer 133 of the high magnitude potential supply FIG. 8. The sources of transistors 132, 134 are coupled to the system's +24 VDC ground RETurn. D FF 200 illustratively is a type CD4013 D FF. Transistor pairs 202, 204 illustratively are type TPQ6002 transistor pairs. The remainder of the PLL circuit is generally as described in U.S. Pat. No. 5,159,544.

Turning to FIG. 7*b*, the PC I SET signal, the current setting coming over to the system from the PLC, is coupled through a 100 KΩ input resistor to the non-inverting (+) input terminal of a difference amplifier 210. The+input terminal of amplifier 210 is coupled through a 49.9 KΩ resistor to ground. The Analog GrouND line of the system bus is coupled through a 100 KΩ input resistor to the inverting (−) input terminal of amplifier 210. The−input terminal of amplifier 210 is through a 49.9 KΩ feedback resistor to its output terminal. The output terminal of amplifier 210 is coupled through a normally closed pair 212*a* of relay 212 contacts to a terminal 214. The normally open pair 212b of contacts of relay 212 is coupled across terminal 214 and the wiper of a 1 KΩ potentiometer 218. This arrangement permits the operator to select either PLC control of the current setting of the system or front panel control of the current setting via potentiometer 218.

A similar configuration including an amplifier 220 permits the system operator to select either PLC control of the desired output high potential magnitude of the high magnitude potential supply. The PC KV SET signal line is coupled through a 100 KΩ input resistor to the+input terminal of amplifier 220. Series 49.9 KΩ resistors between +5 VDC supply and ground bias the−input terminal of amplifier at +2.5 VDC.

Analog GrouND is coupled through a 100 KΩ resistor to the−input terminal of amplifier 220. An RC parallel feedback circuit including a 25.5 KΩ resistor and a 0.01 μF capacitor is coupled across the−input terminal and the output terminal of amplifier 220. The output terminal of amplifier 220 is coupled through the normally closed terminals 96a of a relay 96 to the KV COMmanded line of the system bus. This signal is alternately selectable at the operator's option with a DC voltage established on the+input terminal of a buffer amplifier 224. This DC voltage is established on the wiper of a 1 KΩ potentiometer 90. Potentiometer 90 is in series with an 825 Ω resistor and a 500 Ω potentiometer between +5 VDC and ground. The wiper of the 500 Ω potentiometer is also coupled to ground so that the 825 Ω resistor and the setting of the 500 Ω potentiometer establish the minimum output high magnitude potential settable by the operator at the system front panel. The output of amplifier 220 is selectively coupled across the normally open terminals 96b of relay 96 to the KV COM line. Amplifiers 210, 220 and 224 illustratively ¾ of a type LF444CN quad amplifier.

Referring now to FIG. 7d, the IFB signal from the system bus is coupled to the+input terminal of amplifier 114 via a 47 KΩ input resistor. A 0.22 μF capacitor is coupled between the+input terminal of amplifier 114 and ground. The output terminal of amplifier 114 is coupled to its−input terminal in buffer configuration, and forms the BUFFered IFB terminal which is coupled to the μP 40. The KVFB signal from the system bus is coupled to the+input terminal of amplifier 88 via a 1 KΩ input resistor. The+input terminal of amplifier 88 is clamped between +0.6 VDC and −15.6 VDC by diodes 226, 228 on its+input terminal. The output terminal of amplifier 88 is coupled to its−input terminal in buffer configuration, and forms the BUFFered KVFB terminal which is coupled to the μP 40. BUFFKVFB is also coupled to terminal 118a of PRImary/SECondary FeedBack switch 118. Terminal 118b of switch 118 is coupled to the−input terminal of scaling amplifier 120 via a 20 KΩ series resistor. The+input terminal of amplifier is biased at +⅔ VDC by a series 20 KΩ–10 KΩ voltage divider. The output terminal of amplifier 120, which forms the PulseWidth Modulator CONTrol line of the system bus, is coupled through a 1 KΩ series resistor to the control input terminal, pin 1, of a switching regulator IC VCT regulator 86. VCT appears across the I+output terminal, pin 4, of IC 86 and ground. VCT is fed back through series 0.1Ω, 5 W and 21.5 KΩ resistors to the−input terminal of scaling amplifier 124. The output terminal of amplifier 124 is coupled to its−input terminal through a 15 KΩ feedback resistor, and to terminal 118c of switch 118. Amplifiers 88, 114, 120 and 124 illustratively are a type LF444CN quad amplifier. VCT regulator IC 86 illustratively is a type UC3524A switching regulator.

The analog slope control circuit 116 includes a difference amplifier 230, a difference amplifier 232 and a transistor 234. The−input terminal of amplifier 230 receives the BUFFKVFB signal via the wiper of a 100 KΩ potentiometer and a series 100 KΩ resistor from the output terminal of amplifier 88. A 100 KΩ feedback resistor is coupled between the output terminal and the−input terminal of amplifier 230. The output terminal of amplifier 230 is coupled through a 100 KΩ resistor to the−input terminal of amplifier 232. BUFFIFB is also coupled to the−input terminal of amplifier 232 through a 100 KΩ resistor. The−input terminal of amplifier 232 is biased negative via a 100 KΩ resistor to the wiper of a 100 KΩ potentiometer in series between −15 VDC and ground. The output terminal of amplifier 232 is coupled through a 100 Ω resistor to the base of transistor 234. The collector of transistor 234 is coupled to ground and its emitter is coupled to the COMPensate terminal of IC 86. Amplifiers 230, 232 illustratively are a type LF442CN dual amplifier. Transistor 234 illustratively is a type 2N2907 bipolar transistor.

Referring again to FIG. 7e, the system bus Corona SSeNSe A terminal is coupled to the gate of the VCT shutdown switch 84, and to ground through a 100 KΩ resistor. The drain of switch 84 is coupled through series 6.8 Ω and 390 Ω resistors 240, 242, respectively, to the COMP terminal of IC 86. A 100 μF smoothing capacitor 244 is coupled between the junction of these resistors and ground. The pulsewidth modulated output Corona SSeNSe A signal from μP 40 to the gate of switch 84 results in a DC voltage across capacitor 244. This voltage is summed at the COMP terminal of IC 86 with the output signal from the analog slope control circuit 116. This signal can be provided to the COMP terminal of IC 86 in other ways. For example, μP 40 has a D/A output port. The output signal on the μP 40's D/A output port provides an even smoother signal than the Corona SSeNSe A output signal filtered by the filter 240, 242, 244 to the COMP terminal of IC 86. Using the pulsewidth modulated Corona SSeNSe A output signal from μP 40, filtered by filter 240, 242, 244, or the D/A port of the μP 40, permits added flexibility in applications in which more than one dispensing device 113 is coupled to system. For example, in a single applicator 113 situation, a delay of, for example, one-half second before the achievement of full high magnitude potential can be tolerated by the system. Where multiple applicators 113 are coupled to a common high magnitude potential supply, however, attempting to raise the high magnitude potential to its full commanded value too rapidly can result in charging current greater than the static overload current I SET. μP 40 gives the operator the flexibility to ramp the high magnitude potential up to full commanded value KV SET more slowly in these situations, resulting in fewer "nuisance" overcurrent conditions. Additionally, the slower ramping up to full commanded high voltage eases the stress on the high voltage cables which customarily couple the high magnitude supply to the coating dispensing devices 113. The OSCillator terminal of IC 86 is coupled through a series 1 KΩ resistor and 100 pF capacitor to the common emitters of transistor pair 204. Switch 84 illustratively is a type IRFD210 FET. IC 86 and its associated components function generally as described in U.S. Pat. No. 4,745,520.

A source code listing of the program executed by μP 40 is attached hereto as Exhibit A.

What is claimed is:

1. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the first circuit comprising a first potentiometer for selecting a desired output high magnitude potential, and a conductor for coupling the first potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the third circuit comprising a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

2. The apparatus of claim 1 and further comprising a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

3. The apparatus of claim 1 and further comprising a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

4. The apparatus of claim 3 wherein the $\mu$P indicates a fault if the operating potential is being supplied to the high magnitude potential supply and the high magnitude potential supply is indicating that it is not generating high magnitude potential.

5. The apparatus of claim 1 wherein the fourth circuit comprises a switching regulator having an input terminal forming a summing junction for the first signal and the second signal and an output terminal coupled to the center tap, the fifth circuit including a microprocessor ($\mu$P) and a third switch coupled to the $\mu$P to receive a third switching signal from the $\mu$P, the third switch coupled to the summing junction to couple the third switching signal to the switching regulator to disable the supply of operating potential to the center tap.

6. The apparatus of claim 5 and further comprising a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

7. The apparatus of claim 5 and further comprising a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

8. The apparatus of claim 7 wherein the $\mu$P indicates a fault if the operating potential is being supplied to the high magnitude potential supply and the high magnitude potential supply is indicating that it is not generating high magnitude potential.

9. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the first circuit comprising a first potentiometer for selecting a desired output high magnitude potential, and a conductor for coupling the first potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

10. The apparatus of claim 9 wherein the $\mu$P indicates a fault if the operating potential is being supplied to the high magnitude potential supply and the high magnitude potential supply is indicating that it is not generating high magnitude potential.

11. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the first circuit comprising a first potentiometer for selecting a desired output high magnitude potential, and a conductor for coupling the first potentiometer to the fourth circuit, the second circuit comprising a second potentiometer for selecting a desired output current, and a conductor for coupling the second potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

12. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the first circuit comprising a first potentiometer for selecting a desired output high magnitude potential, and a conductor for coupling the first potentiometer to the fourth circuit, the second circuit comprising a second potentiometer for selecting a desired output current, and a conductor for coupling the second potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

13. The apparatus of claim 12 wherein the $\mu$P indicates a fault if the operating potential is being supplied to the high magnitude potential supply and the high magnitude potential supply is indicating that it is not generating high magnitude potential.

14. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the second circuit comprising a first potentiometer for selecting a desired output current, and a conductor for coupling the first potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

15. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the second circuit comprising a first potentiometer for selecting a desired output current, and a conductor for coupling the first potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor (µP) and a sixth circuit cooperating with the µP to determine if operating potential is being supplied to the high magnitude potential supply, and a seventh circuit cooperating with the µP to determine if the high magnitude potential supply is indicating that it is generating high magnitude potential, the µP indicating a fault if the operating potential is not being supplied to the high magnitude potential supply and the high magnitude potential supply is indicating that it is generating high magnitude potential.

16. The apparatus of claim 15 wherein the µP indicates a fault if the operating potential is being supplied to the high magnitude potential supply and the high magnitude potential supply is indicating that it is not generating high magnitude potential.

17. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the second circuit comprising a first potentiometer for selecting a desired output current, and a conductor for coupling the first potentiometer to the fourth circuit, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the third circuit comprising a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

18. The apparatus of claim 17 and further comprising a microprocessor (µP) and a sixth circuit cooperating with the µP to determine if operating potential is being supplied to the high magnitude potential supply, and a seventh circuit cooperating with the µP to determine if the high magnitude potential supply is indicating that it is generating high magnitude potential, the µP indicating a fault if the operating potential is being supplied to the high magnitude potential supply and the high magnitude potential supply is indicating that it is not generating high magnitude potential.

19. The apparatus of claim 17 and further comprising a microprocessor (µP) and a sixth circuit cooperating with the µP to determine if operating potential is being supplied to the high magnitude potential supply, and a seventh circuit cooperating with the µP to determine if the high magnitude potential supply is indicating that it is generating high magnitude potential, the µP indicating a fault if the operating potential is not being supplied to the high magnitude potential supply and the high magnitude potential supply is indicating that it is generating high magnitude potential.

20. The apparatus of claim 19 wherein the µP indicates a fault if the operating potential is being supplied to the high magnitude potential supply and the high magnitude potential supply is indicating that it is not generating high magnitude potential.

21. The apparatus of claim 17 wherein the fourth circuit comprises a switching regulator having an input terminal forming a summing junction for the first signal and the second signal and an output terminal coupled to the center tap, the fifth circuit including a microprocessor (µP) and a third switch coupled to the µP to receive a third switching signal from the µP, the third switch coupled to the summing junction to couple the third switching signal to the switching regulator to disable the supply of operating potential to the center tap.

22. The apparatus of claim 21 and further comprising a sixth circuit cooperating with the µP to determine if operating potential is being supplied to the high magnitude potential supply, and a seventh circuit cooperating with the µP to determine if the high magnitude potential supply is indicating that it is generating high magnitude potential, the µP indicating a fault if the operating potential is being supplied to the high magnitude potential supply and the high magnitude potential supply is indicating that it is not generating high magnitude potential.

23. The apparatus of claim 21 and further comprising a sixth circuit cooperating with the µP to determine if operating potential is being supplied to the high magnitude potential supply, and a seventh circuit cooperating with the µP to determine if the high magnitude potential supply is indicating that it is generating high magnitude potential, the µP indicating a fault if the operating potential is not being supplied to the high magnitude potential supply and the high magnitude potential supply is indicating that it is generating high magnitude potential.

24. The apparatus of claim 23 wherein the µP indicates a fault if the operating potential is being supplied to the high magnitude potential supply and the high magnitude potential supply is indicating that it is not generating high magnitude potential.

25. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, the third circuit comprising a high magnitude potential transformer having a primary winding and a secondary winding, the primary winding having a center tap and two end terminals, first and second switches coupled to respective ones of the end terminals, and a source of oppositely phased first and second switching signals for controlling the first and second switches, respectively.

26. The apparatus of claim 25 and further comprising a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

27. The apparatus of claim 25 and further comprising a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

28. The apparatus of claim 27 wherein the $\mu$P indicates a fault if the operating potential is being supplied to the high magnitude potential supply and the high magnitude potential supply is indicating that it is not generating high magnitude potential.

29. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is not being supplied to the high magnitude potential supply and the high magnitude potential supply is indicating that it is generating high magnitude potential.

30. The apparatus of claim 29 wherein the $\mu$P indicates a fault if the operating potential is being supplied to the high magnitude potential supply and the high magnitude potential supply is indicating that it is not generating high magnitude potential.

31. In combination, a high magnitude potential supply, a supply of coating material, and a device for dispensing the coating material, the coating material dispensing device being coupled to the supply of coating material and to the high magnitude potential supply to charge the coating material dispensed by the coating material dispensing device, the high magnitude potential supply comprising a first circuit for generating a first signal related to a desired output high magnitude potential across a pair of output terminals of the supply, a second circuit for generating a second signal related to an output current from the high magnitude potential supply, a third circuit for supplying an operating potential to the high magnitude potential supply so that it can produce the high magnitude operating potential, the third circuit having a control terminal, a fourth circuit coupled to the first and second circuits and to the control terminal, the fourth circuit receiving the first and second signals from the first and second circuits and controlling the operating potential supplied to the high magnitude potential supply by the third circuit, and a fifth circuit for disabling the supply of operating potential to the high magnitude potential supply so that no high magnitude operating potential can be supplied by it, the fifth circuit also coupled to the control terminal, a microprocessor ($\mu$P) and a sixth circuit cooperating with the $\mu$P to determine if operating potential is being supplied to the high magnitude potential supply, and a seventh circuit cooperating with the $\mu$P to determine if the high magnitude potential supply is indicating that it is generating high magnitude potential, the $\mu$P indicating a fault if the operating potential is being supplied to the high magnitude potential supply and the high magnitude potential supply is indicating that it is not generating high magnitude potential.

* * * * *